United States Patent
Minokuchi et al.

(10) Patent No.: US 12,273,836 B2
(45) Date of Patent: Apr. 8, 2025

(54) SESSION MANAGEMENT APPARATUS, USER PLANE APPARATUS, AND ACCESS MOBILE MANAGEMENT APPARATUS

(71) Applicant: NTT DOCOMO, INC., Tokyo (JP)

(72) Inventors: Atsushi Minokuchi, Tokyo (JP); Jari Mutikainen, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 406 days.

(21) Appl. No.: 17/754,090

(22) PCT Filed: Sep. 27, 2019

(86) PCT No.: PCT/JP2019/038409
§ 371 (c)(1),
(2) Date: Mar. 23, 2022

(87) PCT Pub. No.: WO2021/059538
PCT Pub. Date: Apr. 1, 2021

(65) Prior Publication Data
US 2022/0338142 A1    Oct. 20, 2022

(51) Int. Cl.
*H04W 56/00* (2009.01)

(52) U.S. Cl.
CPC ....... *H04W 56/004* (2013.01); *H04W 56/001* (2013.01)

(58) Field of Classification Search
CPC ...... H04J 3/0638; H04J 3/0641; H04J 3/0667; H04J 3/12; H04J 3/0644; H04W 56/004; H04W 56/001; H04W 56/0015; H04W 56/00; H04W 76/25
See application file for complete search history.

(56) References Cited

U.S. PATENT DOCUMENTS

2020/0351804 A1*  11/2020  Moon ................ H04W 56/001
2022/0014296 A1   1/2022   Wang

FOREIGN PATENT DOCUMENTS

CN           110213007 A       9/2019

OTHER PUBLICATIONS

Office Action issued in counterpart Japanese Patent Application No. 2021-548307 mailed on Dec. 5, 2023 (6 pages).
3GPP TS 23.501 V16.2.0; "3rd Generation Partnership Project; Technical Specification Group Services and System Aspects; System Architecture for the 5G System; Stage 2 (Release 16)"; Sep. 2019 (7 pages).
Office Action issued in counterpart Chinese Patent Application No. 201980100628.X mailed on Dec. 29, 2023 (9 pages).

(Continued)

*Primary Examiner* — Quoc Thai N Vu
(74) *Attorney, Agent, or Firm* — Osha Bergman Watanabe & Burton LLP

(57) ABSTRACT

A session management apparatus including: a reception unit configured to receive, from a user plane apparatus, time comparison information between a TSN time of a TSN time domain and a 5G time, and identification information of the TSN time domain; and a transmission unit configured to transmit, to a base station apparatus, TSN assistance information determined based on the time comparison information and identification information of a TSN stream for each of one or more TSN streams that belong to the TSN time domain.

5 Claims, 43 Drawing Sheets

(56) References Cited

OTHER PUBLICATIONS

Extended European Search Report issued in counterpart European Application No. 19 94 7327.3 mailed on May 25, 2023 (7 pages).
3GPP TSG-SA WG2 Meeting #134; S2-1908392 "Burst Arrival Time Clock Reference Adjustment Procedure" Samsung; Sapporo, Japan; Jun. 24-28, 2019 (7 pages).
SA WG2 Meeting #133; S2-1905588 "Discussion—TSCAI Granularity and Reference Time used for TSCAI" Nokia, Nokia Shanghai Bell; Reno, Nevada; May 13-17, 2019 (5 pages).
3GPP TSG-RAN WG2 Meeting #107; R2-1909486 "Clarifications on TSC Assistance Information" Nokia, Nokia Shanghai Bell; Prague, Czech Republic; Aug. 26-30, 2019 (4 pages).
SA WG2 Meeting #133; S2-1905656 "Enhancements to 5GS for support of TSCAI Burst Arrival Time" Samsung; Reno, US; May 13-17, 2019 (4 pages).
3GPP TS 23.501 V16.1.0 "3rd Generation Partnership Project; Technical Specification Group Services and System Aspects; System Architecture for the 5G System; Stage 2 (Release 16)" Jun. 2019 (368 pages).
3GPP TS 23.502 V16.1.1 "3rd Generation Partnership Project; Technical Specification Group Services and System Aspects; Procedures for the 5G System; Stage 2 (Release 16)" Jun. 2019 (495 pages).
3GPP Ts 23.503 V16.1.0 "3rd Generation Partnership Project; Technical Specification Group Services and System Aspects; Policy and Charging Control Framework for the 5G System; Stage 2 (Release 16)" Jun. 2019 (99 pages).
3GPP TS 29.244 V16.0.0 "3rd Generation Partnership Project; Technical Specification Group Core Network and Terminals; Interface between the Control Plane and the User Plane Nodes; Stage 3 (Release 16)" Jun. 2019 (217 bages).
3GPP TS 29.518 V15.4.0 "3rd Generation Partnership Project; Technical Specification Group Core Network and Terminals; 5G System; Access and Mobility Management Services; Stage 3 (Release 15)" Jun. 2019 (197 pages).
3GPP TS 38.413 V15.4.0 "3rd Generation Partnership Project; Technical Specification Group Radio Access Network; NG-RAN; NG Application Protocol (NGAP) (Release 15)" Jul. 2019 (328 pages).
3GPP TS 38.415 V15.2.0 "3rd Generation Partnership Project; Technical Specification Group Radio Access Network; NG-RAN; PDU Session User Plane Protocol (Release 15)" Dec. 2018 (12 pages).
International Search Report issued in International Application No. PCT/JP2019/038409, mailed Nov. 19, 2019 (5 pages).
Written Opinion issued in International Application No. PCT/JP2019/038409; Dated Nov. 19, 2019 (4 pages).
"3rd Generation Partnership Project; Technical Specification Group Services and System Aspects; System Architecture for the 5G System; Stage 2 (Release 16)" 3GPP TS 23.501 V16.2.0, XP051776342; Sophia Antipolis Cedex, France; Sep. 2019; (392 pages).
Office Action issued in European Application No. 19947327.3, dated Jun. 25, 2024 (7 pages).

\* cited by examiner

FIG.6

| Assistance Information | Description |
|---|---|
| Flow Direction | The direction of the TSC flow (uplink or downlink). |
| Periodicity | It refers to the time period between start of two bursts. |
| Burst Arrival time | The arrival time of the data burst at either the ingress of the RAN (downlink flow direction) or egress interface of the UE (uplink flow direction). |

FIG. 8

5.27.2    TSC Assistance Information (TSCAI)

TSC assistance information describes TSC traffic characteristics for use in the 5G System. The knowledge of TSN traffic pattern is useful for the gNB to allow it to more efficiently schedule periodic, deterministic traffic flows either via Configured Grants, Semi-Persistent Scheduling or with dynamic grants. TSC assistance information, as defined in Table 5.27.2-1, is provided from SMF to 5G-AN, e.g. upon QoS flow establishment. The TSCAI parameters are set according to corresponding parameters obtained from the AF. The maximum value of TSC Burst Size should be mapped to a 5QI with MDBV that is equal or higher. For TSC QoS flows, MDBV (described in clause 5.7.3.7) is set to the Maximum Burst Size of the aggregated TSC streams to be allocated to this QoS flow. If the AF does not provide a TSC Burst Size for aggregated TSC streams, then the MDBV is set to the default value for the TSC 5QI of the corresponding traffic class.

The determination of the TSCAI by the SMF is based on information received from the TSN AF. The Burst Arrival Time component and the Periodicity component of the TSCAI that is signalled to the 5G-AN are specified with respect to the 5G clock. The SMF is responsible for mapping the Burst Arrival Time and the Periodicity from a TSN clock (that the TSN stream is based on) to the 5G clock.

In the case of drift between TSN time and 5G time, the UPF updates the offset to SMF. In the case of change of the cumulative rateRatio between TSN time and 5G time, the UPF updates the cumulative rateRatio to SMF. The SMF may then trigger a PDU session modification as defined in TS 23.502 [3] clause 4.3.3 in order to update the TSCAI parameter to the NG-RAN without requiring AN specific signalling exchange with the UE.

The TSCAI is signalled to the 5G-AN per TSN stream. This applies also to the case when multiple TSN streams are forwarded via the same QoS flow in the same PDU session.

To address each individual drift and change of the cumulative rateRatio between each TSN time and 5G time when supporting multiple TSN working domains, the UPF updates the offset and the cumulative rateRatio to SMF per TSN working domain. Then the SMF identifies TSN streams belonging to each TSN working domain within the same UE and the same UPF, calculates revised TSCAIs, and triggers PDU session modification(s).

NOTE:    The network is configured so that the same SMF is always selected for PDU sessions that use TSCAI and that involve the same UE and the same UPF.

FIG.9

5.3.1 Interactions between PCF and AF

Npcf and Naf enable transport of application level session information from AF to PCF. Such information includes, but is not limited to:

- IP filter information or Ethernet packet filter information to identify the service data flow for policy control and/or differentiated charging;
- Media/application bandwidth requirements for QoS control;

In addition, for sponsored data connectivity:

- the sponsor's identification;
- optionally, a usage threshold and whether the PCF reports these events to the AF;
- information identifying the application service provider and application (e.g. SDFs, application identifier, etc.);
- information required to enable Application Function influence on traffic routing as defined in clause 5.6.7 of TS 23.501 [2]; and
- <u>TSN AF provides burst arrival time (in reference to TSN GM), periodicity (in reference to TSN GM), flow direction, and time domain identifier needed for TSCAI determination (as described in clauses 5.27 and 5.28 of TS 23.501 [2]).</u>

(a)

- TSN AF Parameters:
  - Burst Arrival Time in reference to TSN GM;
  - Periodicity in reference to TSN GM;
  - Flow direction;
  - Time Domain Identifier
  - Delay Requirement in reference to TSN GM;

(b)

| Information name | Description | Category | PCF permitted to modify for a dynamic PCC rule in the SMF | Differences compared with table 6.3. in TS 23.203 [4] |
|---|---|---|---|---|
| TSN AF QoS container | *This part defines parameters provided by TSN AF. Following are the parameters:*<br>- Burst Arrival Time - Indicates the burst arrival time in reference to TSN GM and ingress port.<br>- Periodicity The time period (in reference to TSN GM) between start of two bursts.<br>- Flow Direction: Direction of the flow<br>- Time Domain Identifier | | No | Added |

The TSN AF container contains the following parameters:

- The *Burst Arrival Time* is sent to the SMF to indicate burst arrival time at the ingress port of 5GS for a given flow direction (DS-TT for UL, NW-TT for DL). It is used by the SMF to determine TSCAI burst arrival time as defined in TS 23.501[2], clause 5.27.2 to assist transmission of deterministic flows on Uu.

- The *Periodicity* is sent to the SMF to indicate the time between bursts. It is used by the SMF to forward to RAN as part of TSCAI in order to assist transmission of deterministic flows on Uu.The *Flow direction* is sent to SMF to indicate the direction of the flow (UL or DL).

- The *Time Domain Identifier* is sent to SMF to indicate the identifier of the time domain of TSN GM referenced to define Burst Arrival Time and Periodicity.

5.x Support of Time Sensitive Communications

5.x.y TSC Assistance Information (TSCAI)

5.x.y.w Reporting of the offset and the cumulative rateRatio between TSN time and 5G time to the SMF In a PFCP Session Establishment Request or a PFCP Session Modification Request, the SMF may request the UPF to start or stop (in a PFCP Session Modification Request only) reporting the offset and the cumulative rateRatio between TSN time and 5G time, by:

- creating a PTR requesting the UPF to report the offset (i.e. with the PTP Reporting Triggers set to "Time Offset Reporting") and the cumulative rateRatio (i.e. with the PTP Reporting Triggers set to Time RateRatio Reporting); and

- associating the PTR to a PDR that is enhanced to detect gPTP messages, their fields, and their field values in particular for domainNumber, correctionField, and Timestamp as well as their payload. The PTR and the PDR are then provisioned for the DL traffic of the PDU session.

When being requested to start reporting the offset and the cumulative rateRatio, the UPF shall:

- report immediately any offset values and any cumulative rateRatio values known to be associated to the PDU session (i.e. for all the domainNumber(s)) together with each corresponding domainNumber.

NOTE: cumulative rateRatio values to be reported are not the cumulative rateRatio received inside the gPTP message payload, but the new cumulative rateRatio calculated at UPF (i.e. NW-TT) as specified in subclause 5.27.1.2.2 of 3GPP TS 23.501 [28].

- report new offset values and new cumulative rateRatio values for new domainNumber(s) that are detected subsequently.

- report immediately any offset values that have been drifted and any cumulative rateRatio values that have been changed, together with each corresponding domainNumber, by initiating the PFCP Session Report procedure.

Table 7.5.2.1-1: Information Elements in an PFCP Session Establishment Request

| Information elements | P | Condition / Comment | Appl. Sxa | Appl. Sxb | Appl. Sxc | N4 | IE Type |
|---|---|---|---|---|---|---|---|
| Node ID | M | This IE shall contain the unique identifier of the sending Node. | X | X | X | X | Node ID |
| CP F-SEID | M | This IE shall contain the unique identifier allocated by the CP function identifying the session. | X | X | X | X | F-SEID |
| Create PDR | M | This IE shall be present for at least one PDR to be associated to the PFCP session.<br><br>Several IEs with the same IE type may be present to represent multiple PDRs.<br>See Table 7.5.2.2-1. | X | X | X | X | Create PDR |
| Create FAR | M | This IE shall be present for at least one FAR to be associated to the PFCP session.<br><br>Several IEs with the same IE type may be present to represent multiple FARs.<br>See Table 7.5.2.3-1. | X | X | X | X | Create FAR |
| Create URR | C | This IE shall be present if a measurement action shall be applied to packets matching one or more PDR(s) of this PFCP session.<br>Several IEs within the same IE type may be present to represent multiple URRs.<br>See Table 7.5.2.4-1. | X | X | X | X | Create URR |
| Create QER | C | This IE shall be present if a QoS enforcement or QoS marking action shall be applied to packets matching one or more PDR(s) of this PFCP session.<br>Several IEs within the same IE type may be present to represent multiple QERs.<br>See Table 7.5.2.5-1. | - | X | X | X | Create QER |
| Create BAR | O | When present, this IE shall contain the buffering instructions to be applied by the UP function to any FAR of this PFCP session set with the Apply Action requesting the packets to be buffered and with a BAR ID IE referring to this BAR. See table 7.5.2.6-1. | X | - | - | X | Create BAR |
| Create Traffic Endpoint | C | This IE may be present if the UP function has indicated support of PDI optimization.<br>Several IEs within the same IE type may be present to represent multiple Traffic Endpoints.<br>See Table 7.5.2.7-1. | X | X | X | X | Create Traffic Endpoint |
| Create PTR | C | This IE shall be present if reporting of PTP related events shall be applied to packets matching one or more PDR(s) of this PFCP session.<br>Several IEs within the same IE type may be present to represent multiple PTRs.<br>See Table 7.5.2.x-1. | - | - | - | X | Create PTR |
| PDN Type | C | This IE shall be present if the PFCP session is setup for an individual PDN connection or PDU session (see clause 5.2.1).<br>When present, this IE shall indicate whether this is an IP or non-IP PDN connection/PDU session or, for 5GC, an Ethernet PDU session. | X | X | - | X | PDN Type |
| SGW-C FQ-CSID | C | This IE shall be included according to the requirements in clause 23 of 3GPP TS 23.007 [24]. | X | X | - | | FQ-CSID |
| MME FQ-CSID | C | This IE shall be included when received on the S11 interface or on S5/S8 interface according to the requirements in clause 23 of 3GPP TS 23.007 [24]. | X | X | - | - | FQ-CSID |
| PGW-C FQ-CSID | C | This IE shall be included according to the requirements in clause 23 of 3GPP TS 23.007 [24]. | X | X | - | - | FQ-CSID |
| ePDG FQ-CSID | C | This IE shall be included according to the requirements in clause 23 of 3GPP TS 23.007 [24]. | - | X | - | - | FQ-CSID |
| TWAN FQ-CSID | C | This IE shall be included according to the requirements in clause 23 of 3GPP TS 23.007 [24]. | - | X | - | - | FQ-CSID |
| User Plane Inactivity Timer | O | This IE may be present to request the UP function to send a User Plane Inactivity Report when no user plane | - | X | X | X | User Plane Inactivity Timer |

FIG.14

Table 7.5.2.2-1: Create PDR IE within PFCP Session Establishment Request

| Octet 1 and 2 | | Create PDR IE Type = 1(decimal) | | | | | |
|---|---|---|---|---|---|---|---|
| Octets 3 and 4 | | Length = n | | | | | |
| Information elements | P | Condition / Comment | Appl. | | | | IE Type |
| | | | Sxa | Sxb | Sxc | N4 | |
| PDR ID | M | This IE shall uniquely identify the PDR among all the PDRs configured for that PFCP session. | X | X | X | X | PDR ID |
| Precedence | M | This IE shall indicate the PDR's precedence to be applied by the UP function among all PDRs of the PFCP session, when looking for a PDR matching an incoming packet. | - | X | X | X | Precedence |
| PDI | M | This IE shall contain the PDI against which incoming packets will be matched. See Table 7.5.2.2-2. | X | X | X | X | PDI |
| Outer Header Removal | C | This IE shall be present if the UP function is required to remove one or more outer header(s) from the packets matching this PDR. | X | X | - | X | Outer Header Removal |
| FAR ID | C | This IE shall be present if the Activate Predefined Rules IE is not included or if it is included but it does not result in activating a predefined FAR, and if the MAR ID is not included. When present this IE shall contain the FAR ID to be associated to the PDR. | X | X | X | X | FAR ID |
| URR ID | C | This IE shall be present if a measurement action shall be applied to packets matching this PDR. When present, this IE shall contain the URR IDs to be associated to the PDR. Several IEs within the same IE type may be present to represent a list of URRs to be associated to the PDR. | X | X | X | X | URR ID |
| QER ID | C | This IE shall be present if a QoS enforcement or QoS marking action shall be applied to packets matching this PDR. When present, this IE shall contain the QER IDs to be associated to the PDR. Several IEs within the same IE type may be present to represent a list of QERs to be associated to the PDR. | - | X | X | X | QER ID |
| PTR ID | C | This IE shall be present if reporting of PTP related events shall be applied to packets matching this PDR. When present, this IE shall contain the PTR IDs to be associated to the PDR. Several IEs within the same IE type may be present to represent a list of PTRs to be associated to the PDR. | - | - | - | X | PTR ID |
| Activate Predefined Rules | C | This IE shall be present if Predefined Rule(s) shall be activated for this PDR. When present this IE shall contain one Predefined Rules name. Several IEs with the same IE type may be present to represent multiple "Activate Predefined Rules" names. | - | X | X | X | Activate Predefined Rules |
| Activation Time | O | This IE may be present if the PDR activation shall be deferred. (NOTE 1) | - | X | X | X | Activation Time |
| Deactivation Time | O | This IE may be present if the PDR deactivation shall be deferred. (NOTE 1) | - | X | X | X | Deactivation Time |
| MAR ID | C | This IE shall be present if the PDR is provisioned to match the downlink traffic towards the UE for a PFCP session established for a MA PDU session. | - | - | - | X | MAR ID |
| NOTE 1: When the Activation Time and Deactivation Time are not present, the PDR shall be activated immediately at receiving the message. | | | | | | | |

FIG.15

Table 7.5.2.2-3: Ethernet Packet Filter IE within PFCP Session Establishment Request

| Octet 1 and 2 | | Ethernet Packet Filter IE Type = 132 (decimal) | | | | |
|---|---|---|---|---|---|---|
| Octets 3 and 4 | | Length = n | | | | |
| Information elements | P | Condition / Comment | Sx a | Appl. Sx b | Sx c | N4 | IE Type |

| Information elements | P | Condition / Comment | Sx a | Sx b | Sx c | N4 | IE Type |
|---|---|---|---|---|---|---|---|
| Ethernet Filter ID | C | This shall be present if Bidirectional Ethernet filter is required. This IE shall uniquely identify an Ethernet Filter among all the Ethernet Filters provisioned for a given PFCP session. | - | - | - | X | Ethernet Filter ID |
| Ethernet Filter Properties | C | This IE shall be present when provisioning a bidirectional Ethernet Filter the first time (see clause 5.13.4). | - | - | - | X | Ethernet Filter Properties |
| MAC address | O | If present, this IE shall identify the MAC address. This IE may be present up to 16 times. | - | - | - | X | MAC address |
| Ethertype | O | If present, this IE shall identify the Ethertype. | - | - | - | X | Ethertype |
| C-TAG | O | If present, this IE shall identify the Customer-VLAN tag. | - | - | - | X | C-TAG |
| S-TAG | O | If present, this IE shall identify the Service-VLAN tag. | - | - | - | X | S-TAG |
| EtherType | O | If present, this IE shall identify the EtherType | - | - | - | X | EtherType |
| SDF Filter | O | If packet filtering is required, for Ethernet frames with Ethertype indicating IPv4 or IPv6 payload, this IE shall describe the IP Packet Filter Set. Several IEs with the same IE type may be present to represent a list of SDF filters. | - | - | - | X | SDF Filter |

FIG.16

7.5.2.x Create PTR IE within PFCP Session Establishment Request

The Create PTR IE shall be encoded as shown in Figure 7.5.2.x-1.

Table 7.5.2.x-1: Create PTR IE within PFCP Session Establishment Request

| Octet 1 and 2 | | Create PTR IE Type = yy (decimal) | | | | | |
|---|---|---|---|---|---|---|---|
| Octets 3 and 4 | | Length = n | | | | | |
| Information elements | P | Condition / Comment | Appl. | | | | IE Type |
| | | | Sx a | Sx b | Sx c | N4 | |
| PTR ID | M | This IE shall uniquely identify the PTR among all the PTRs configured for this PFCP session. | -- | -- | -- | X | PTR ID |
| PTP Reporting Triggers | M | This IE shall indicate the trigger(s) for reporting PTP related events to the CP function. | -- | -- | -- | X | PTP Reporting Triggers |
| [...] | | | | | | | |

FIG.17

Table 7.5.4.1-1: Information Elements in a PFCP Session Modification Request

| Information elements | P | Condition / Comment | Appl. Sxa | Appl. Sxb | Appl. Sxc | Appl. N4 | IE Type |
|---|---|---|---|---|---|---|---|
| CP F-SEID | C | This IE shall be present if the CP function decides to change its F-SEID for the PFCP session. The UP function shall use the new CP F-SEID for subsequent PFCP Session related messages for this PFCP Session. See | X | X | X | X | F-SEID |
| Remove BAR | C | When present, this IE shall contain the PDR Rule which is requested to be removed. See Table 7.5.4.12-1. | X | X | X | X | |
| Remove Traffic Endpoint | C | When present, this IE shall contain the Traffic Endpoint ID identifying the traffic endpoint to be removed, if the UP function has indicated support of PDI optimization. All the PDRs that refer to the removed Traffic Endpoint shall be deleted. See Table 7.5.4.14-1. | X | X | X | X | Remove Traffic Endpoint |
| <u>Remove PTR</u> | <u>C</u> | <u>When present, this shall contain the PTR Rule which is requested to be removed. See Table 7.5.4.y-1. Several IEs within the same IE type may be present to represent a list of PTRs to remove.</u> | <u>-</u> | <u>-</u> | <u>-</u> | <u>X</u> | <u>Remove PTR</u> |
| | | ...nt if the CP function requests the Several IEs within the same... represent a list of QERs to create | X | X | X | X | |
| Create BAR | C | This IE shall be present if the CP function requests the UP function to create a new BAR. See Table 7.5.2.6-1. | X | - | - | X | Create BAR |
| Create Traffic Endpoint | C | When present this IE shall contain the information associated with the Traffic Endpoint to be created, if the UP function has indicated support of PDI optimization. See Table 7.5.2.7-1. | X | X | X | X | Create Traffic Endpoint |
| <u>Create PTR</u> | <u>C</u> | <u>This IE shall be present if the CP function requests the UP function to create a new PTR. See Table 7.5.2.x-1. Several IEs within the same IE type may be present to represent a list of PTRs to create</u> | <u>-</u> | <u>-</u> | <u>-</u> | <u>X</u> | <u>Create PTR</u> |
| Update PDR | C | This IE shall be present if a PDR previously created for the PFCP session need to be modified. See Table ...sent to See Table 7.5.4.11-1. | X | X | X | X | Update PDR |
| Update Traffic Endpoint | C | When present this IE shall contain the information associated with the traffic endpoint to be updated, if the UP function has indicated support of PDI optimization. All the PDRs that refer to the Traffic Endpoint shall use the updated Traffic Endpoint information. See Table 7.5.4.13-1. | | | | | Update Traffic Endpoint |
| <u>Update PTR</u> | <u>C</u> | <u>This IE shall be present if PTR(s) previously created for the PFCP session need to be modified. Several IEs within the same IE type may be present to represent a list of modified PTRs. Previously created PTRs that are not modified shall not be included. See Table 7.5.4.x-1.</u> | <u>-</u> | <u>-</u> | <u>-</u> | <u>X</u> | <u>Update PTR</u> |
| PFCPSMReq-Flags | C | This IE shall be included if at least one of the flags is set to 1.<br>- DROBU (Drop Buffered Packets): the CP function shall set this flag if the UP function is requested to drop the packets currently buffered for this PFCP session (see NOTE 1).<br>- QAURR (Query All URRs): the CP function shall set this flag if the CP function requests immediate usage report(s) for all the URRs previously provisioned for this PFCP session (see NOTE 3). | X<br><br><br><br><br>X | -<br><br><br><br><br>X | -<br><br><br><br><br>X | X<br><br><br><br><br>X | PFCPSMReq-Flags |

FIG.18

Table 7.5.4.2-1: Update PDR IE within PFCP Session Modification Request

| Octet 1 and 2 | | Update PDR IE Type = 9 (decimal) | | | | | |
|---|---|---|---|---|---|---|---|
| Octets 3 and 4 | | Length = n | | | | | |
| Information elements | P | Condition / Comment | Appl. | | | | IE Type |
| | | | Sx a | Sx b | Sx c | N4 | |
| PDR ID | M | This IE shall uniquely identify the PDR among all the PDRs configured for that PFCP session. | X | X | X | X | PDR ID |
| Outer Header Removal | C | This IE shall be present if it needs to be changed. | X | X | - | X | Outer Header Removal |
| Precedence | C | This IE shall be present if there is a change in the PDR's precedence to be applied by the UP function among all PDRs of the PFCP session, when looking for a PDR matching an incoming packet | - | X | X | X | Precedence |
| PDI | C | This IE shall be present if there is a change within the PDI against which incoming packets will be matched. When present, this IE shall replace the PDI previously stored in the UP function for this PDR. See Table 7.5.2.2-2. | X | X | X | X | PDI |
| FAR ID | C | This IE shall be present if it needs to be changed | X | X | X | X | FAR ID |
| URR ID | C | This IE shall be present if a measurement action shall be applied or no longer applied to packets matching this PDR. When present, this IE shall contain the list of all the URR IDs to be associated to the PDR. | X | X | X | X | URR ID |
| QER ID | C | This IE shall be present if a QoS enforcement action shall be applied or no longer applied to packets matching this PDR. When present, this IE shall contain the list of all the QER IDs to be associated to the PDR. | - | X | X | X | QER ID |
| PTR ID | C | This IE shall be present to judge if reporting of PTP related events shall be applied or no longer applied to packets matching this PDR. When present, this IE shall contain the list of all the PTR IDs to be associated to the PDR. | | | | | PTR ID |
| Activate Predefined Rules | C | This IE shall be present if new Predefined Rule(s) needs to be activated for the PDR. When present this IE shall contain one Predefined Rules name. Several IEs with the same IE type may be present to represent multiple "Activate Predefined Rules" names. | - | X | X | X | Activate Predefined Rules |
| Deactivate Predefined Rules | C | This IE shall be present if Predefined Rule(s) needs to be deactivated for the PDR. When present this IE shall contain one Predefined Rules name. Several IEs with the same IE type may be present to represent multiple "Activate Predefined Rules" names. | - | X | X | X | Deactivate Predefined Rules |
| Activation Time | O | This IE may be present if the PDR activation time shall be changed. (NOTE 2) | - | X | X | X | Activation Time |
| Deactivation Time | O | This IE may be present if the PDR deactivation time shall be changed. (NOTE 2) | - | X | X | X | Deactivation Time |
| NOTE1: The IEs which do not need to be modified shall not be included in the Update PDR IE. The UP function shall continue to behave according to the values previously received for IEs not present in the Update PDR IE. | | | | | | | |
| NOTE2: When the Activation Time and Deactivation Time are not present, the PDR shall keep its current activation status, either active or inactive. | | | | | | | |

FIG. 19

7.5.4.x Update PTR IE within PFCP Session Modification Request

The Update PTR IE shall be encoded as shown in Figure 7.5.4.x-1.

Table 7.5.4.x-1: Update PTR IE within PFCP Session Modification Request

Octet 1 and 2: Update PTR IE Type = zz (decimal)
Octets 3 and 4: Length = n

| Information elements | P | Condition / Comment | Appl. | | | | IE Type |
| --- | --- | --- | --- | --- | --- | --- | --- |
| | | | Sx a | Sx b | Sx c | N4 | |
| PTR ID | M | This IE shall uniquely identify the PTR among all the PTRs configured for this PFCP session. | :: | :: | :: | X | PTR ID |
| PTP Reporting Triggers | M | This IE shall be present to inform the PTP reporting triggers needs to be modified. When present, this IE shall indicate the trigger(s) for reporting PTP related events to the CP function. | :: | :: | :: | X | PTP Reporting Triggers |
| [..] | | | | | | | |

FIG.20

7.5.4.y  Remove PTR IE within PFCP Session Modification Request

The Remove PTR IE shall be encoded as shown in Figure 7.5.4.y-1.

Table 7.5.4.y-1: Remove PTR IE within PFCP Session Modification Request

| Octet 1 and 2 | | Remove PTR IE Type = ww (decimal) | | | | |
|---|---|---|---|---|---|---|
| Octets 3 and 4 | | Length = n | | | | |
| | | | Appl. | | | |
| Information elements | P | Condition / Comment | Sx a | Sx b | Sx c | N4 | IE Type |
| PTR ID | M | This IE shall identify the PTR to be deleted. | - | - | - | X | PTR ID |

Table 7.5.8-1: Information Elements in a PFCP Session Report Request

| Information elements | P | Condition / Comment | Sx a | Sx b | Sx c | N4 | IE Type |
|---|---|---|---|---|---|---|---|
| Report Type | M | This IE shall indicate the type of the report. | X | X | X | X | Report Type |
| Downlink Data Report | C | This IE shall be present if the Report Type indicates a Downlink Data Report. | X | - | - | X | Downlink Data Report |
| Usage Report | C | This IE shall be present if the Report Type indicates a Usage Report. Several IEs within the same IE type may be present to represent a list of Usage Reports. | X | X | X | X | Usage Report |
| Error Indication Report | C | This IE shall be present if the Report Type indicates an Error Indication Report. | X | - | - | X | Error Indication Report |
| Load Control Information | O | The UP function may include this IE if it supports the load control feature and the feature is activated in the network. See Table 7.5.3.3-1. | X | X | X | X | Load Control Information |
| Overload Control Information | O | During an overload condition, the UP function may include this IE if it supports the overload control feature and the feature is activated in the network. See Table 7.5.3.4-1. | X | X | X | X | Overload Control Information |
| Additional Usage Reports Information | C | This IE shall be included in one additional PFCP Session Report Request message, if the PFCP Session Modification Response indicated that more reports would follow (i.e. if the AURI flag was set to 1) (see clause 5.2.2.3.1). When present, this IE shall indicate the total number of usage reports that need to be sent in PFCP Session Report Request messages. | X | X | X |  | Additional Usage Reports Information |
| PFCPSRReq-Flags | C | This IE shall be included if at least one of the flags is set to 1. PSDBU (PFCP Session Deleted By the UP function): if both the CP function and UP function support the EPFAR feature, the UP function may set this flag if the UP function needs to delete the PFCP session, e.g. to report all remaining non-zero usage reports for all URRs in the PFCP Session and the PFCP session is being deleted locally in the UP function. | X | X | X | X | PFCPSRReq-Flags |
| PTP Report | C | This IE shall be present if the Report Type indicates a PTP Report. | - | - | - | X | PTP Report |

Table 7.5.8.x-1: PTP Report IE within PFCP Session Report Request

| Octet 1 and 2 | PTP Report IE Type = yy (decimal) | | | | | |
|---|---|---|---|---|---|---|
| Octets 3 and 4 | Length = n | | | | | |
| Information elements | P | Condition / Comment | Appl. | | | IE Type |
| | | | Sx a | Sx b | Sx c | N4 |
| PTR ID | M | This IE shall identify the PTR for which PTP related events are reported. | -- | -- | -- | X | PTR ID |
| Time Comparison Information | M | This IE shall indicate a combination of the domainNumber carried in the gPTP message, the offset between TSN time of that domain and 5G time, and the cumulative rateRatio between TSN time of that domain and 5G time. Several IEs with the same IE type may be present to report for multiple domain occurrences for this PTR ID. | -- | -- | -- | X | Time Comparison Information |

Table 7.5.8.x-2: Time Comparison Information IE within PTP Report IE

| Octet 1 and 2 | Time Comparison Information IE Type = zz (decimal) | | | | | |
|---|---|---|---|---|---|---|
| Octets 3 and 4 | Length = n | | | | | |
| Information elements | P | Condition / Comment | Appl. | | | IE Type |
| | | | Sx a | Sx b | Sx c | N4 |
| Domain Number | M | This IE shall contain the domainNumber carried in the gPTP message. | -- | -- | -- | X | Domain Number |
| Time Offset | O | This IE shall contain the offset between TSN time of that domain and 5G time. | -- | -- | -- | X | Time Offset |
| Time RateRatio | O | This IE shall contain the cumulative rateRatio between TSN time of that domain and 5G time. | -- | -- | -- | X | Time RateRatio |

8.2.21 Report Type

The Report Type IE shall be encoded as shown in Figure 8.2.21-1. It indicates the type of the report the UP function sends to the CP function.

| Octets | 8 | 7 | 6 | 5 | 4 | 3 | 2 | 1 |
|---|---|---|---|---|---|---|---|---|
| 1 to 2 | | | | Type = 39 (decimal) | | | | |
| 3 to 4 | | | | Length = n | | | | |
| 5 | Spare | | | PTPR | UPIR | ERIR | USAR | DLDR |
| 6 to (n+4) | These octet(s) is/are present only if explicitly specified | | | | | | | |

Figure 8.2.21-1: Report Type

Octet 5 shall be encoded as follows:

- Bit 1 – DLDR (Downlink Data Report): when set to 1, this indicates Downlink Data Report.
- Bit 2 – USAR (Usage Report): when set to 1, this indicates a Usage Report.
- Bit 3 – ERIR (Error Indication Report): when set to 1, this indicates an Error Indication Report.
- Bit 4 – UPIR (User Plane Inactivity Report): when set to 1, this indicates a User Plane Inactivity Report.
- Bit 5 – PTPR (PTP Report): when set to 1, this indicates a PTP Report.
- Bit 6 to 8 – Spare, for future use and set to 0.

At least one bit shall be set to 1. Several bits may be set to 1.

FIG. 23

8.2.x  EtherType

The EtherType IE shall be encoded as shown in Figure 8.2.x-1. It shall contain the EtherType values as assigned by IEEE Registration Authority.

```
                            Bits
Octets      8    7    6    5    4    3    2    1
1 to 2                Type = xx (decimal)
3 to 4                   Length = n
5 to 6                    EtherType
7 to (n+4)    These octet(s) is/are present only if explicitly specified
```
Figure 8.2.x-1: EtherType

In this release of specification, only 0x88F7 is used (for Precision Time Protocol (PTP) over Ethernet (IEEE 1588))

8.2.y  PTR ID

The PTR ID IE shall be encoded as shown in Figure 8.2.y-1. It shall contain a gPTP message Rule ID.

```
                            Bits
Octets      8    7    6    5    4    3    2    1
1 to 2                Type = yy (decimal)
3 to 4                   Length = n
5 to 8                   PTR ID value
9 to (n+4)    These octet(s) is/are present only if explicitly specified
```
Figure 8.2.y-1: PTR ID

The PTR ID value shall be encoded as an Unsigned32 binary integer value.

The bit 8 of octet 5 is used to indicate if the Rule ID is dynamically allocated by the CP function or predefined in the UP function. If set to 0, it indicates that the Rule is dynamically provisioned by the CP Function. If set to 1, it indicates that the Rule is predefined in the UP Function.

8.2.z PTP Reporting Triggers

The PTP Reporting Triggers IE shall be encoded as shown in Figure 8.2.z-1. It indicates the PTP related reporting trigger(s) for the UP function to send a report to the CP function.

| Octets | Bits 8 | 7 | 6 | 5 | 4 | 3 | 2 | 1 |
|---|---|---|---|---|---|---|---|---|
| 1 to 2 | Type = ww (decimal) ||||||||
| 3 to 4 | Length = n ||||||||
| 5 | Spare | Spare | Spare | Spare | Spare | Spare | TIRR | TIOF |
| 6 to (n+4) | These octet(s) is/are present only if explicitly specified ||||||||

Figure 8.2.z-1: PTP Reporting Triggers

Octet 5 shall be encoded as follows:

- Bit 1 – TIOF (Time Offset Reporting): when set to 1, this indicates a request for reporting the offset between TSN time and 5G time.
- Bit 2 – TIRR (Time RateRatio Reporting): when set to 1, this indicates a request for reporting the cumulative rateRatio between TSN time and 5G time.

8.2.w Domain Number

The Domain Number IE shall be encoded as shown in Figure 8.2.w-1. It shall contain the domainNumber carried in the coorresponding gPTP message.

| Octets | Bits 8 | 7 | 6 | 5 | 4 | 3 | 2 | 1 |
|---|---|---|---|---|---|---|---|---|
| 1 to 2 | Type = vy (decimal) ||||||||
| 3 to 4 | Length = n ||||||||
| 5 | Domain Number ||||||||
| 6 to (n+4) | These octet(s) is/are present only if explicitly specified ||||||||

Figure 8.2.w-1: Domain Number

Editor's note: how to express values are to be in line with IEEE 1588, in particular with domainNumber.

FIG.26

8.2.p    Time Offset

The Time Offset IE shall be encoded as shown in Figure 8.2.p-1. It shall contain an offset value between TSN time of a certain domain and 5G time.

| Octets | Bits |
|--------|------|
|        | 8  7  6  5  4  3  2  1 |
| 1 to 2 | Type = pp (decimal) |
| 3 to 4 | Length = n |
| 5 to 12 | Time Offset |
| 13 to (n+4) | These octet(s) is/are present only if explicitly specified |

Figure 8.2.p-1: Time Offset

Editor's note: how to express values are to be in line with IEEE 1588, in particular with correctionField.

FIG.27

8.2.q    Time RateRatio

The Time RateRatio IE shall be encoded as shown in Figure 8.2.q-1. It shall contain a cumulative rateRatio value between TSN time of a certain domain and 5G time.

| Octets | Bits | | | | | | | |
|---|---|---|---|---|---|---|---|---|
| | 8 | 7 | 6 | 5 | 4 | 3 | 2 | 1 |
| 1 to 2 | Type = qq (decimal) | | | | | | | |
| 3 to 4 | Length = n | | | | | | | |
| 5 to 12 | Time RateRatio | | | | | | | |
| 13 to (n+4) | These octet(s) is/are present only if explicitly specified | | | | | | | |

Figure 8.2.q-1: Time RateRatio

Editor's note: how to express values are FFS.

FIG.28

If Control Plane CIoT 5GS Optimiation is enabled for this PDU session and the SMF selects the NEF as the anchor of this PDU Session in step 8, the SMF performs SMF-NEF Connection Establishment Procedure as described in clause 4.24.1.

If SMF decides to use TSCAI for this PDU session, SMF includes a rule to detect drift of offset and change of the cumulative rateRatio between TSN time and 5G time in the N4 Session Establishment/Modification Request.

10b. The UPF acknowledges by sending an N4 Session Establishment/Modification Response.

FIG.29

1d. (SMF requested modification) The SMF may decide to modify PDU Session. This procedure also may be triggered based on locally configured policy or triggered from the (R)AN (see clause 4.2.6 and clause 4.9.1). It may also be triggered if the UP connection is activated (as described in Service Request procedure) and the SMF has marked that the status of one or more QoS Flows are deleted in the 5GC but not synchronized with the UE yet. It may also be triggered if SMF decides to update TSCAI, e.g. when UPF reports drift of offset or change of the cumulative rateRatio between TSN time and 5G time by using N4 Session Report, and in this case the SMF proceeds to step 3b.

If the SMF receives one of the triggers in step 1b ~ 1d, the SMF starts SMF requested PDU Session Modification procedure.

FIG.30

If redundant transmission has not been activated to the PDU Session and the SMF decides to perform redundant transmission for the new QoS Flow with two I-UPFs between the PSA UPF and the NG-RAN, the SMF allocates CN Tunnel Info of two I-UPFs if CN Tunnel Info is allocated by the SMF. The CN Tunnel Info of two I-UPFs is provided to the I-UPFs via N4 Session Establishment Request messages including UL CN Tunnel Info of the PSA UPF. An N4 Session Modification Request message including DL CN Tunnel Info of two I-UPFs is sent to the PSA UPF. The SMF indicates the PSA UPF to perform packet duplication and elimination for the QoS Flow.

If SMF decides to use TSCAI for this PDU session, SMF includes a rule to detect drift of offset and change of the cumulative rateRatio between TSN time and 5G time in the N4 Session Establishment/Modification Request.

- For each QoS flow requested to be setup, if the *Traffic Characteristics* list IE is included in the *PDU Session Resource Setup Request Transfer* IE of the PDU SESSION RESOURCE SETUP REQUEST message, the NG-RAN node shall, if supported, take into account the received *Traffic Characteristics* list IE.

- For each QoS flow which has been successfully established, the NG-RAN node shall store the mapped E-RAB ID if included in the *PDU Session Resource Setup Request Transfer* IE contained in the PDU SESSION RESOURCE SETUP REQUEST message and use it as specified in TS 38.300 [8].

FIG.32

- If *Traffic Characteristics list IE* is included in the *PDU Session Resource Modify Request Transfer* IE of the PDU SESSION RESOURCE MODIFY REQUEST message the NG-RAN node shall, if supported, take into account the received *Traffic Characteristics list* IE The NG-RAN node shall report to the AMF, in the PDU SESSION RESOURCE MODIFY RESPONSE message, the result for each PDU session requested to be modified listed in the PDU SESSION RESOURCE MODIFY REQUEST message:

FIG.33

9.3.4.1 PDU Session Resource Setup Request Transfer

This IE is transparent to the AMF.

| IE/Group Name | Presence | Range | IE type and reference | Semantics description | Criticality | Assigned Criticality |
|---|---|---|---|---|---|---|
| PDU Session Aggregate Maximum Bit Rate | O | | 9.3.1.102 | This IE shall be present when at least one Non-GBR QoS flow is being setup. | YES | reject |
| UL NG-U UP TNL Information | M | | UP Transport Layer Information 9.3.2.2 | UPF endpoint of the NG-U transport bearer, for delivery of UL PDUs. | YES | reject |
| Additional UL NG-U UP TNL Information | O | | UP Transport Layer Information List 9.3.2.12 | UPF endpoint of the additional NG-U transport bearer(s), for delivery of UL PDUs for split PDU session. | YES | reject |
| Data Forwarding Not Possible | O | | 9.3.1.63 | This IE may be present in case of HANDOVER REQUEST message and shall be ignored otherwise. | YES | reject |
| PDU Session Type | M | | 9.3.1.52 | | YES | reject |
| Security Indication | O | | 9.3.1.27 | | YES | reject |
| Network Instance | O | | 9.3.1.113 | | YES | reject |
| QoS Flow Setup Request List | | 1 | | | YES | reject |
| >QoS Flow Setup Request Item | | 1..<maxno ofQoSFlo ws> | | | - | |
| >>QoS Flow Identifier | M | | 9.3.1.51 | | - | |
| >>QoS Flow Level QoS Parameters | M | | 9.3.1.12 | | - | |
| >>E-RAB ID | O | | 9.3.2.3 | | - | |
| >>Traffic Characteristics | O | | x.y.z | Details in TS 23.501 [9]. This IE carry the additional Traffic pattern information associated with the QFI. | - | ignore |

| Range bound | Explanation |
|---|---|
| maxnoofQoSFlows | Maximum no. of QoS flows allowed within one PDU session. Value is 64. |

FIG.34

9.3.4.3 PDU Session Resource Modify Request Transfer

This IE is transparent to the AMF.

| IE/Group Name | Presence | Range | IE type and reference | Semantics description | Criticality | Assigned Criticality |
|---|---|---|---|---|---|---|
| PDU Session Aggregate Maximum Bit Rate | O | | 9.3.1.102 | | YES | reject |
| UL NG-U UP TNL Modify List | | 0..1 | | | YES | reject |
| >UL NG-U UP TNL Modify Item | | 1..<maxno ofMultiCon nectivity> | | | - | |
| >>UL NG-U UP TNL Information | M | | UP Transport Layer Information 9.3.2.2 | UPF endpoint of the NG-U transport bearer, for delivery of UL PDUs. | - | |
| >>DL NG-U UP TNL Information | M | | UP Transport Layer Information 9.3.2.2 | Identifies the NG-U transport bearer at the NG-RAN node. | - | |
| Network Instance | O | | 9.3.1.113 | | YES | reject |
| QoS Flow Add or Modify Request List | | 0..1 | | | YES | reject |
| >QoS Flow Add or Modify Request Item | | 1..<maxno ofQoSFlo ws> | | | - | |
| >>QoS Flow Identifier | M | | 9.3.1.51 | | - | |
| >>QoS Flow Level QoS Parameters | O | | 9.3.1.12 | | - | |
| >>E-RAB ID | O | | 9.3.2.3 | | - | |
| >>Traffic Characteristics list | | 0..1 | | | - | - |
| >>>Traffic Characteristic item | | 1..<maxno ofTsnStre ams> | | | - | - |
| >>>>Tsn Stream identifier | M | | p.q.r | Details in TS 23.501 [9]. | - | - |
| >>>>Traffic Characteristic | M | | x.y.z | Details in TS 23.501 [9]. | - | - |
| QoS Flow to Release List | O | | QoS Flow List with Cause 9.3.1.13 | | YES | reject |
| Additional UL NG-U UP TNL Information | O | | UP Transport Layer Information List 9.3.2.12 | UPF endpoint of the additional NG-U transport bearer(s) proposed for delivery of UL PDUs for split PDU session. | YES | reject |

| Range bound | Explanation |
|---|---|
| maxnoofQoSFlows | Maximum no. of QoS flows allowed within one PDU session. Value is 64. |
| maxnoofMultiConnectivities | Maximum no. of connectivity allowed for a UE. Value is 4. The current version of the specification supports up to 2 connectivity. |
| maxnoofTsnStreams | Maximum no. of TSN streams allowed within one QoS Flow. Value is tbd. | x.y.z  Traffic Characteristics

This IE defines the additional Traffic pattern information associated with the QFI.

Note: the parameters will be refined according to TS 23.501 [9].

| IE/Group Name | Presence | Range | IE type and reference | Semantics description |
|---|---|---|---|---|
| Parameter 1 | M | | BIT STRING (SIZE(29)) | |
| Parameter 2 | M | | BIT STRING (SIZE(28)) | |
| Parameter 3 | M | | BIT STRING (SIZE(28)) | | p.q.r  Tsn Stream Identifier

This IE identifies a TSN stream within a QoS Flow. The definition and use of the Tsn Stream Identifier is specified in TS 23.501 [9].

Note: the parameters will be refined according to TS 23.501 [9].

| IE/Group Name | Presence | Range | IE type and reference | Semantics description |
|---|---|---|---|---|
| Tsn Stream Identifier | M | | INTEGER (0..63,...) | |

9.3.1.10 GBR QoS Flow Information

This IE indicates QoS parameters for a GBR QoS flow for downlink and uplink.

| IE/Group Name | Presence | Range | IE type and reference | Semantics description |
|---|---|---|---|---|
| Maximum Flow Bit Rate Downlink | M | | Bit Rate 9.3.1.4 | Maximum Bit Rate in DL. Details in TS 23.501 [9]. |
| Maximum Flow Bit Rate Uplink | M | | Bit Rate 9.3.1.4 | Maximum Bit Rate in UL. Details in TS 23.501 [9]. |
| Guaranteed Flow Bit Rate Downlink | M | | Bit Rate 9.3.1.4 | Guaranteed Bit Rate (provided there is data to deliver) in DL. Details in TS 23.501 [9]. |
| Guaranteed Flow Bit Rate Uplink | M | | Bit Rate 9.3.1.4 | Guaranteed Bit Rate (provided there is data to deliver). Details in TS 23.501 [9]. |
| Notification Control | O | | ENUMERATED (notification requested, ...) | Details in TS 23.501 [9]. |
| Maximum Packet Loss Rate Downlink | O | | Packet Loss Rate 9.3.1.79 | Indicates the maximum rate for lost packets that can be tolerated in the downlink direction. Details in TS 23.501 [9]. |
| Maximum Packet Loss Rate Uplink | O | | Packet Loss Rate 9.3.1.79 | Indicates the maximum rate for lost packets that can be tolerated in the uplink direction. Details in TS 23.501 [9]. |
| TSC Assistance Information List | | 0..1 | | |
| >TSC Assistance Information Item | | 1..<maxnoofTsnStreams> | | |
| >>Tsn Stream Identifier | M | | Tsn Stream Identifier 9.3.r | |
| >>TSC Assistance Information Downlink | O | | TSC Assistance Information 9.3.1.x | This IE may be present in case of Delay Critical GBR QoS flows, and shall be ignored otherwise. |
| >> TSC Assistance Information Uplink | O | | TSC Assistance Information 9.3.1.x | This IE may be present in case of Delay Critical GBR QoS flows, and shall be ignored otherwise. |

| Range bound | Explanation |
|---|---|
| maxnoofTsnStreams | Maximum no. of TSN streams allowed within one QoS Flow. Value is tbd. |

FIG.37

9.3.1.x    TSC Assistance Information

Editor's Note: Additional parameters, if needed, are FFS (pending SA2).

This IE describes the TSC traffic characteristics (see TS 23.501 [9]).

| IE/Group Name | Presence | Range | IE type and reference | Semantics description |
|---|---|---|---|---|
| Periodicity | M | | [FFS] | Periodicity as specified in TS 23.501 [9]. |
| Burst Arrival Time | O | | [FFS] | Burst Arrival Time as specified in TS 23.501 [9]. | p.q.r    Tsn Stream Identifier

This IE identifies a TSN stream within a QoS Flow. The definition and use of the Tsn Stream Identifier is specified in TS 23.501 [9].

Note: the parameters will be refined according to TS 23.501 [9].

| IE/Group Name | Presence | Range | IE type and reference | Semantics description |
|---|---|---|---|---|
| Tsn Stream Identifier | M | | INTEGER (0..63, ...) | |

FIG.38

5.4.1.1    Successful operation

The purpose of the Transfer of DL PDU Session Information procedure is to send control information elements related to the PDU Session from UPF/NG-RAN to NG-RAN.

A PDU Session user plane instance making use of the Transfer of DL PDU Session Information procedure is associated to a single PDU Session. The Transfer of DL PDU Session Information procedure may be invoked whenever packets for that particular PDU Session need to be transferred across the related interface instance.

The DL PDU SESSION INFORMATION frame includes a QoS Flow Identifier (QFI) field associated with the transferred packet. The NG-RAN shall use the received QFI to determine the QoS flow and QoS profile which are associated with the received packet.

The DL PDU SESSION INFORMATION frame shall include the Reflective QoS Indicator (RQI) field to indicate that user plane Reflective QoS shall be activated or not. The NG-RAN shall, if RQA has been configured for the involved QoS flow, take the RQI into account as specified in TS 37.324 [4].

The DL PDU SESSION INFORMATION frame may also include a Paging Policy Indicator (PPI) field associated with the transferred packet. The NG-RAN shall use the received PPI to determine the paging policy differentiation which is associated with the received packet as described in [5].

The DL PDU SESSION INFORMATION frame may also include a Tsn Stream Identifier (TSI) field associated with the transferred packet. The NG-RAN may use the received TSI to differentiate TSN streams (see details in 3GPP TS 23.501 [5]).

FIG. 40

5.5.3.7    Tsn Stream Identifier (TSI)

Description: When present, the Tsn Stream Identifier is used for differentiation of TSN streams (see details in 3GPP TS 23.501 [5]).

Value range: {0..tbd}.

Field length: tbd bits.

SESSION MANAGEMENT APPARATUS, USER PLANE APPARATUS, AND ACCESS MOBILE MANAGEMENT APPARATUS

TECHNICAL FIELD

The present invention relates to network apparatuses in a communication system.

BACKGROUND ART

In the 3rd Generation Partnership (3rd GPP) project, a wireless communication system called 5G or NR (hereinafter, the wireless communication system is referred to as "5G" or "NR") is being studied in order to achieve further increase in system capacity, further increase in data transmission speed, and further decrease in the delay in the wireless section. In 5G, various wireless technologies are being studied in order to achieve a throughput of 10 Gbps or higher and to meet the requirement of a delay of 1 ms or less in the wireless section.

In 5G, a network architecture that includes 5GC (5G Core Network) corresponding to EPC (Evolved Packet Core), which is the core network in the LTE (Long Term Evolution) network architecture, and NG-RAN (Next Generation Access Network) corresponding to E-UTRAN (Evolved Universal Terrestrial Radio Access Network), which is the RAN (Radio Access Network) in the LTE network architecture, is under consideration. In some cases, NG-RAN is referred to as 5G-AN, RAN, or gNB.

In recent years, there has been an increase in the demand for synchronous control of a large number of devices in factories, etc., and a standard for synchronous communication (IEEE P802.1Qcc, etc.) that enables such control has been specified.

In the 5G system, TSC (Time Sensitive Communication) specified in IEEE P802.1Qcc is also supported (Non-Patent Document 1). In the TSC, the 5G system functions as a TSN (Time Sensitive Networking) bridge.

In addition, TSC support information (TSC Assistance Information) describing TSC traffic characteristics is provided by SMF to NG-RAN. The gNB, which is NG-RAN, is able to understand a TSN traffic pattern and perform efficient schedule, etc. by TSCAI.

PRIOR ART DOCUMENTS

Non-Patent Documents

[Non-Patent Document 1] 3GPP TS 23.501 V16.1.0 (2019-06)
[Non-Patent Document 2] 3GPP TS 23.502 V16.1.1 (2019-06)
[Non-Patent Document 3] 3GPP TS 29.244 V16.0.0 (2019-06)
[Non-Patent Document 4] 3GPP TS 29.518 V15.4.0 (2019-06)
[Non-Patent Document 5] 3GPP TS 38.413 V15.4.0 (2019-07)
[Non-Patent Document 6] 3GPP TS 38.415 V15.2.0 (2018-12)
[Non-Patent Document 7] 3GPP TS 23.503 V16.1.0 (2019-06)

SUMMARY OF INVENTION

Problem to be Solved by the Invention

As described in Non-Patent Document 1, when a drift difference occurs between a TSN time and a 5G time in a TSN time domain, the core NW notifies NG-RAN of a modified TSCAI parameter. The TSN time domain may also be referred to as a "time domain". In this specification, it is assumed that TSCAI is applied per TSN stream.

Although the 5G system supports multiple TSN time domains, the above modified TSCAI needs to be applied only to a specific TSN stream, to which the TSCAI should be applied, of multiple TSN streams belonging to multiple TSN time domains.

The present invention has been developed in view of the foregoing, and is intended to provide a technique that enables TSC assistance information to be applied only to a specific TSN stream.

Means for Solving Problems

According to the disclosed technique, there is provided a session management apparatus including: a reception unit configured to receive, from a user plane apparatus, time comparison information between a TSN time of a TSN time domain and a 5G time, and identification information of the TSN time domain; and a transmission unit configured to transmit, to a base station apparatus, TSN assistance information determined based on the time comparison information and identification information of a TSN stream for each of one or more TSN streams that belong to the TSN time domain.

Effects of the Invention

According to the disclosed technique, there is provided a technique that allows TSC assistance information to be applied only to a specific TSN stream.

BRIEF DESCRIPTION OF DRAWINGS

FIG. 6 is a diagram showing TSC Assistance Information.

FIG. 8 is a diagram showing an example of changes to the specification (TS23.501).

FIG. 9 is a diagram showing an example of a change to the specification (TS23.503).

FIG. 10 is a diagram showing an example of a change to the specification (TS23.503).

FIG. 11 is a diagram showing an example of a change to the specification (TS23.503).

FIG. 12 is a diagram showing an example of a change to the specification (TS29.244).

FIG. 13 is a diagram showing an example of a change to the specification (TS29.244).

FIG. 14 is a diagram showing an example of a change to the specification (TS29.244).

FIG. 15 is a diagram showing an example of a change to the specification (TS29.244).

FIG. 16 is a diagram showing an example of a change to the specification (TS29.244).

FIG. 17 is a diagram showing an example of a change to the specification (TS29.244).

FIG. 18 is a diagram showing an example of a change to the specification (TS29.244).

FIG. 19 is a diagram showing an example of a change to the specification (TS29.244).

FIG. 20 is a diagram showing an example of a change to the specification (TS29.244).

FIG. 21 is a diagram showing an example of a change to the specification (TS29.244).

FIG. 22 is a diagram showing an example of a change to the specification (TS29.244).

FIG. 23 is a diagram showing an example of a change to the specification (TS29.244).

FIG. 24 is a diagram showing an example of changes to the specification (TS29.244).

FIG. 25 is a diagram showing an example of changes to the specification (TS29.244).

FIG. 26 is a diagram showing an example of changes to the specification (TS29.244).

FIG. 27 is a diagram showing an example of changes to the specification (TS29.244).

FIG. 28 is a diagram showing an example of changes to the specification (TS23.502).

FIG. 29 is a diagram showing an example of changes to the specification (TS23.502).

FIG. 30 is a diagram showing an example of changes to the specification (TS23.502).

FIG. 31 is a diagram showing an example of changes to the specification (TS38.413).

FIG. 32 is a diagram showing an example of changes to the specification (TS38.413).

FIG. 33 is a diagram showing an example of changes to the specification (TS38.413).

FIG. 34 is a diagram showing an example of changes to the specification (TS38.413).

FIG. 35 is a diagram showing an example of changes to the specification (TS38.413).

FIG. 36 is a diagram showing an example of changes to the specification (TS38.413).

FIG. 37 is a diagram showing an example of changes to the specification (TS38.413).

FIG. 38 is a diagram showing an example of changes to the specification (TS38.415).

FIG. 40 is a diagram showing an example of changes to the specification (TS38.415).

MODE FOR CARRYING OUT THE INVENTION

Hereinafter, embodiments of the present invention will be described with reference to the drawings. The embodiments described below are examples, and the embodiments to which the present invention is applied are not limited to the following embodiments.

In operating the communication system according to an embodiment of the present invention, existing techniques may be used, as appropriate. The existing technology is, for example, an existing LTE or existing 5G, but is not limited to an existing LTE or existing 5G.

In the following description, the node name, signal name, etc. currently described in the 5G specification (or the LTE specification) are used. However, the node name, signal name, etc. having the same function may be called by a different name.

(Example of System Configuration)

Figure 1:
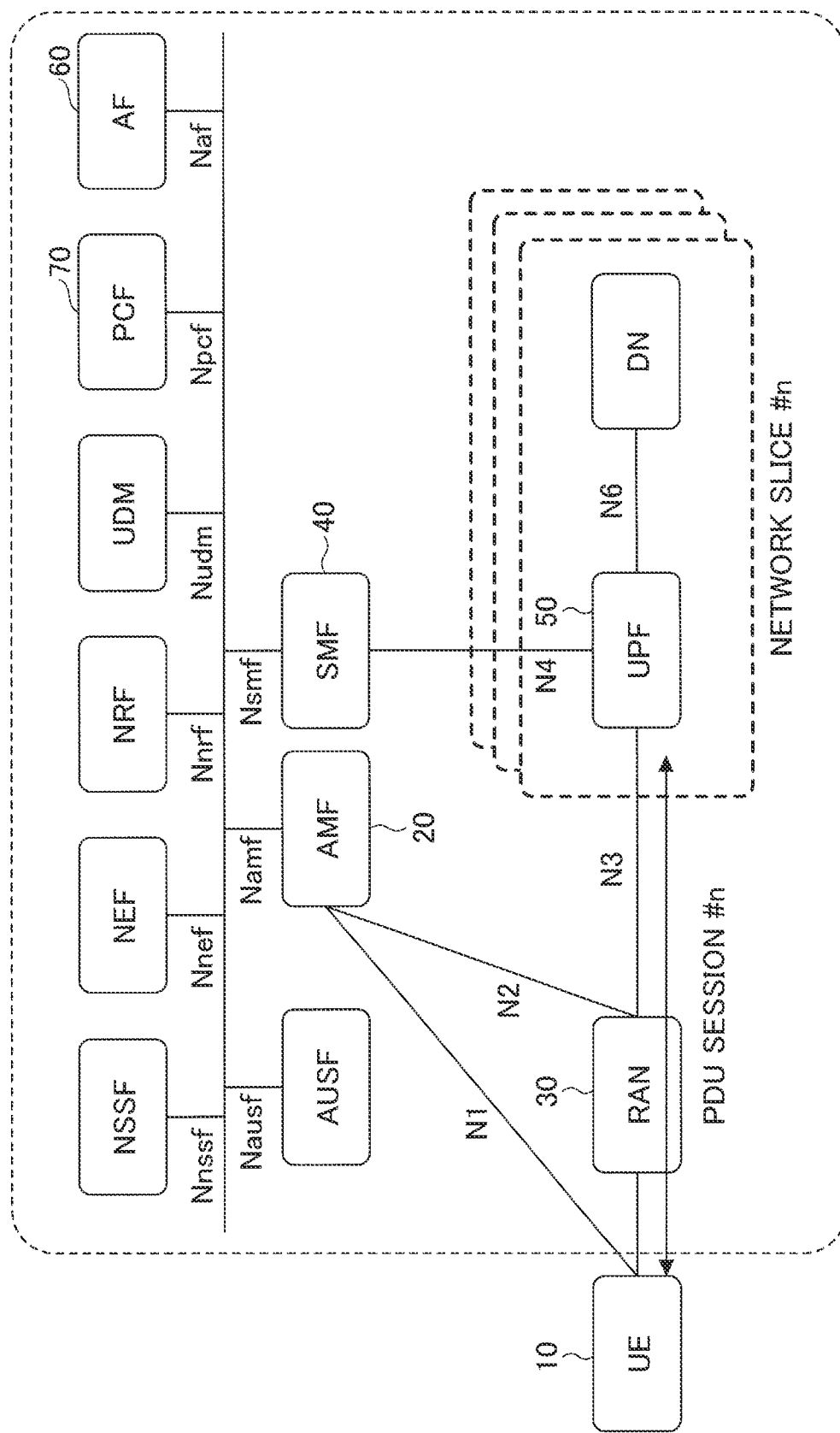
FIG. 1 is a diagram for explaining a communication system according to an embodiment of the present invention.

FIG. 1 is a diagram illustrating a communication system (may be referred to as a communication network) according to an embodiment of the present invention. As shown in FIG. 1, the communication system comprises a UE 10 (which may be referred to as a user equipment 10 or terminal 10), and a plurality of network nodes. Hereinafter, one network node corresponds to each function, but multiple functions may be realized by one network node or multiple network nodes may realize one function. Also, "connection" described below may be a logical connection or a physical connection.

In FIG. 1, each of the UPF 50, the AMF 20, and the SMF 40 is an example of a network node (also referred to as a network apparatus) that constitutes a core network of a communication system (here, 5G). Communication between the RAN 30 and the UPF 50 is performed via the core network.

RAN (Radio Access Network) 30 is a network node with wireless access functions, and is connected to the UE 10, the AMF (Access and Mobility Management Function) 20 and the UPF (User plane function) 50. The RAN 30 may also be referred to as a gNB 30 or a base station apparatus 30.

The AMF 20 is a network node having functions such as a RAN interface termination, a NAS (Non-Access Stratum) termination, registration management, connection management, reachability management, and mobility management. The AMF 20 may also be referred to as an access mobility management apparatus.

The UPF 50 is a network node having functions such as a PDU (Protocol Data Unit) session point for an external entity interconnecting with a DN (Data Network), packet routing and forwarding, and QoS (Quality of Service) handling on the user plane. The UPF 50 transmits and receives user data. The UPF 50 and the DN constitute network slices. In the communication network according to an embodiment of the present invention, a plurality of network slices are formed.

In the example of FIG. 1, one UPF 50 corresponds to one network slice. However, one UPF 50 may operate multiple network slices. The UPF 50 may also be referred to as a user plane apparatus.

The UPF 50 is physically, for example, one or more computers (servers, etc.). A plurality of resources that can logically integrate and divide hardware resources (CPU, memory, hard disk, network interface, etc.) of the computer can be regarded as resource pools, and each resource can be used as a network slice in the resource pool. When the UPF 50 operates a network slice, for example, it manages correspondence between a network slice and a resource, starts and stops the resource, and monitors operational status of the resource, and so on.

The AMF 20 is connected to the UE 10, the RAN 30, the SMF (Session Management function) 40, a NSSF (Network Slice Selection Function), a NEF (Network Exposure Function), a NRF (Network Repository Function), an AUSF (Authentication Server Function), a PCF (Policy Control Function), and an AF (Application Function). The AMF, the SMF, the NSSF, the NEF, the NRF, the AUSF, the PCF, and the AF are interconnected network nodes via their respective service-based interfaces, Namf, Nsmf, Nnssf, Nnef, Nnrf, Nausf, Npcf, and Naf. In the present embodiment, the AF 60 corresponds to the TSN AF to be described later.

The SMF 40 is a network node having functions such as session management, Internet Protocol (IP) address assignment and management of UE, DHCP (DHCP) function, Address Resolution Protocol (ARP) proxy, and roaming function, and the like. The SMF 40 may also be referred to as a session management apparatus.

The NEF is a network node that has a function to notify other NFs (Network Functions) of capabilities and events. The NSSF is a network node that has functions such as selecting a network slice to which a UE connects, determining an allowed NSSAI (Network Slice Selection Assistance Information), determining a NSSAI to be configured, and determining an AMF set to which the UE connects. The PCF is a network node having a function for controlling a policy of the network. The AF is a network node that has a function of controlling an application server.

(Basic Operation)

Figure 2:
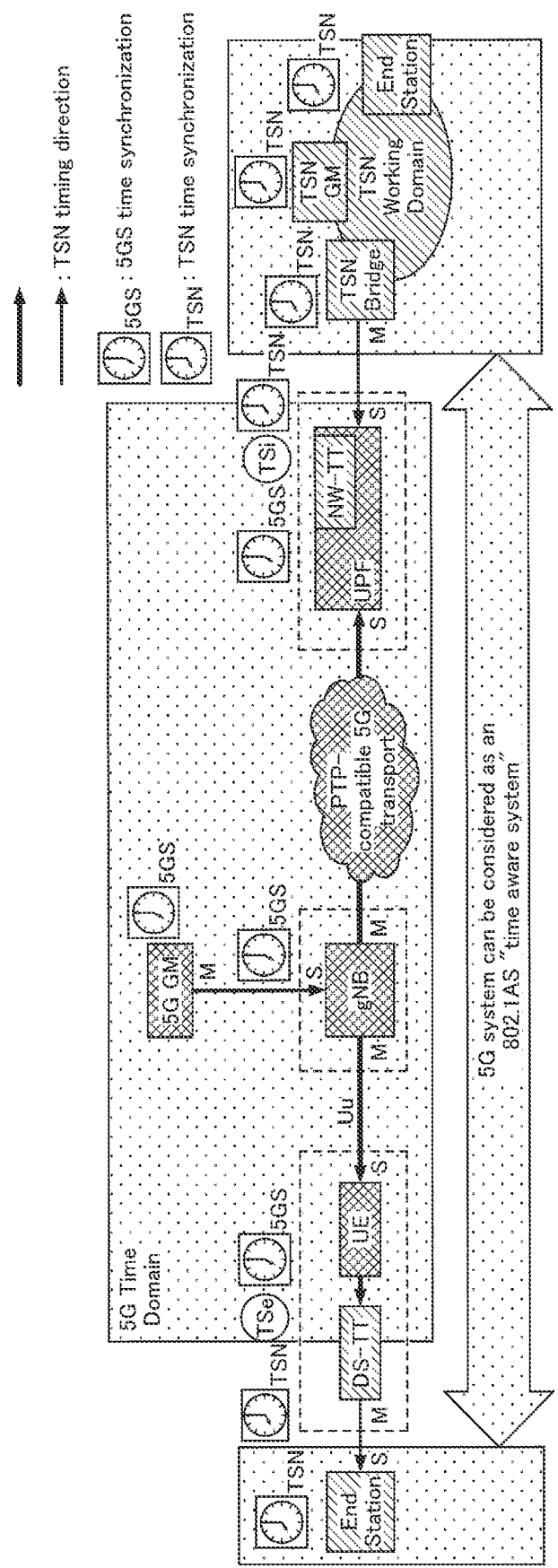
FIG. 2 is a diagram showing a system configuration of TSN Time Synchronization.
Figure 5:
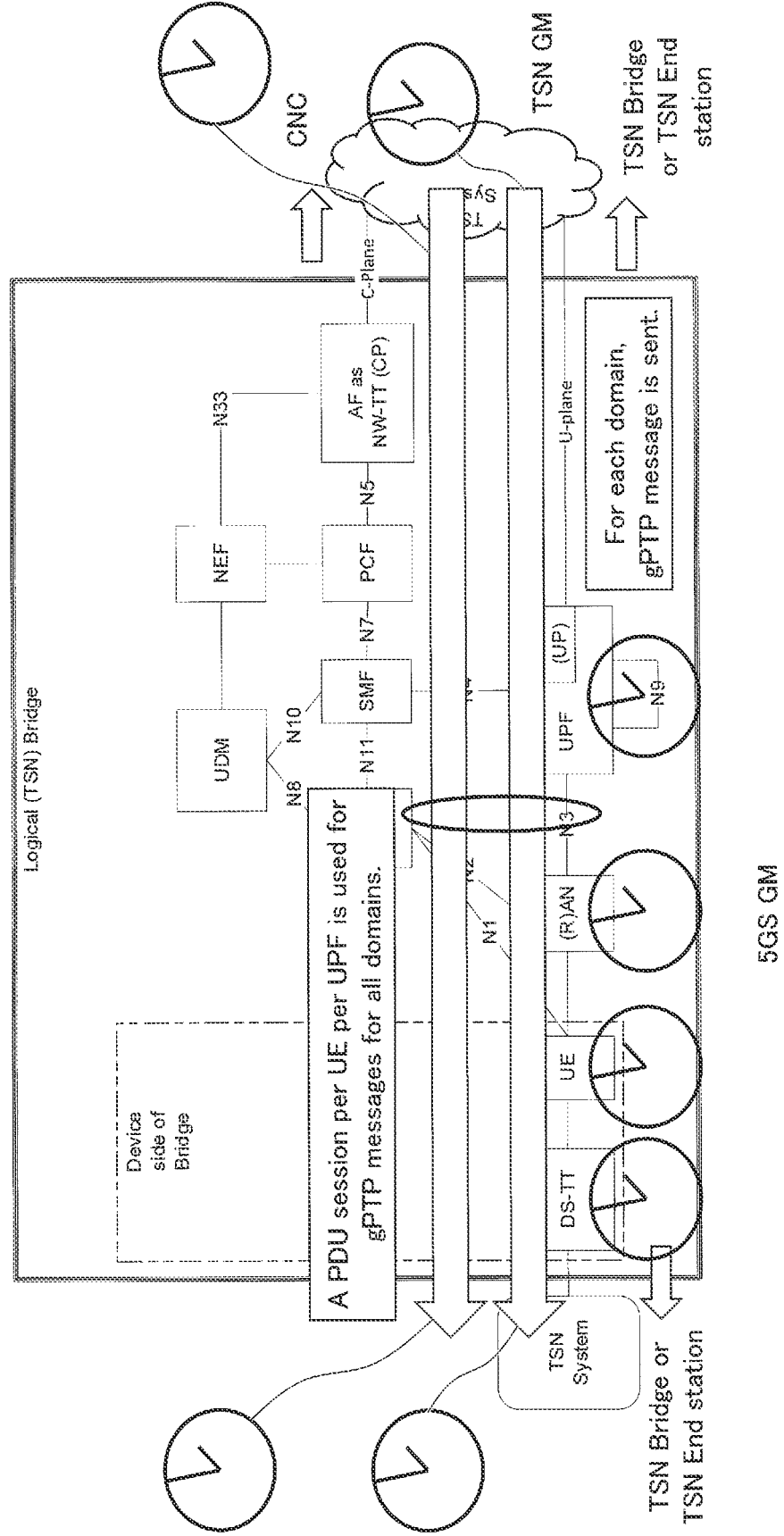
FIG. 5 is a diagram for explaining an operation in a TSN bridge.

The communication system (5G system) in accordance with this embodiment supports TSN time synchronization as shown in FIG. 2 (FIG. 5.27.1-1 of Non-Patent Document 1). A 5G system that supports TSN time synchronization corresponds to "time aware system" in IEEE 802.1AS. In the 5G system, only the TSN translator (TT) at its edge supports the operation of IEEE 802.1AS, and a UE, a gNB, a UPF, a NW-TT (Network-side TSN translator), and a DS-TT (Device-side TSN translator) are synchronized to 5G GM (5G internal system clock).

Figure 3:
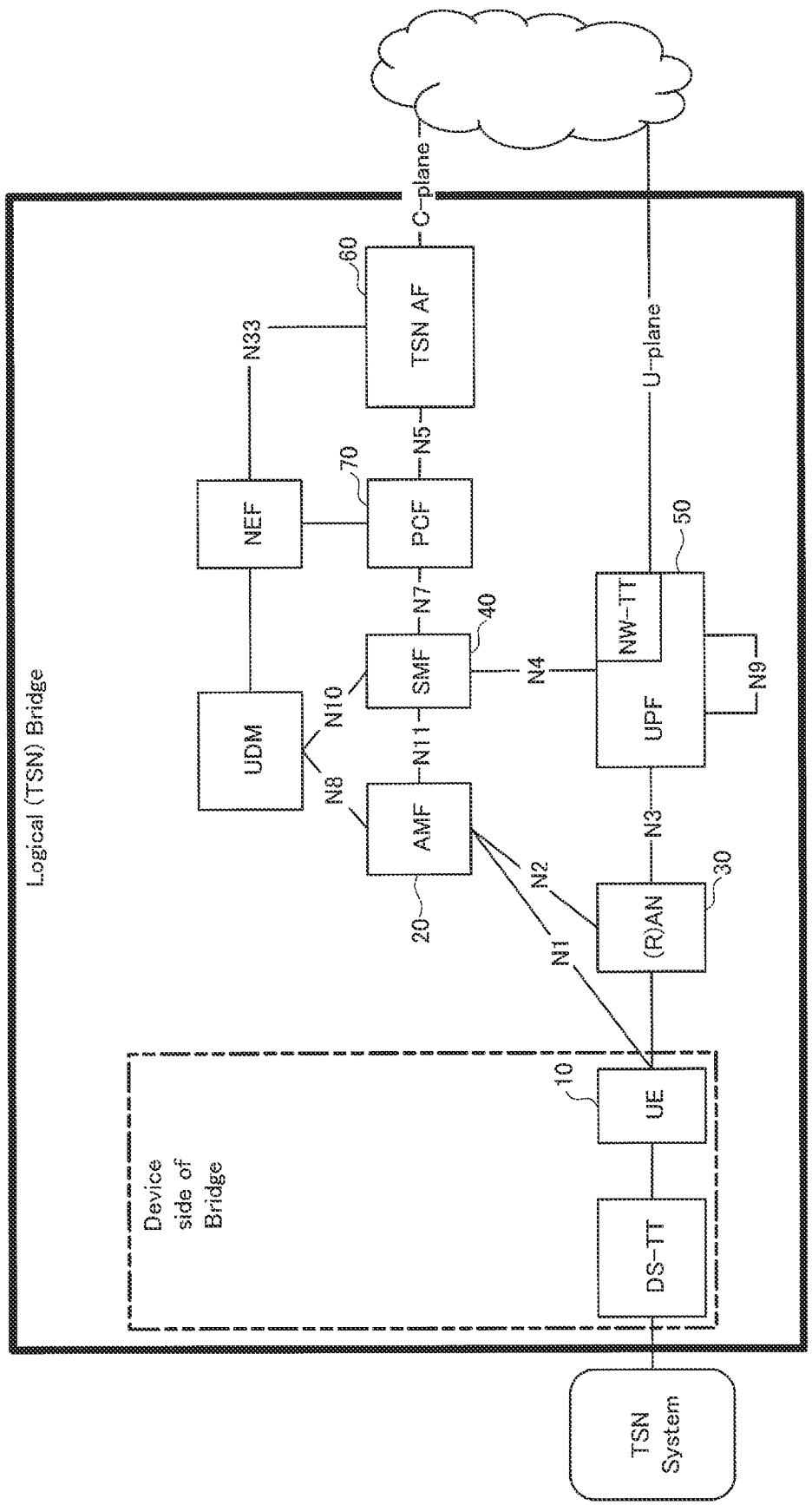
FIG. 3 is a diagram showing a TSN bridge.

As shown in FIG. 3 (FIG. 4.4.8.2-1, Non-Patent Document 1), the 5G system functions as a TSN bridge. FIG. 3 shows a TSN AF which is an application node related to TSN.

Figure 4:
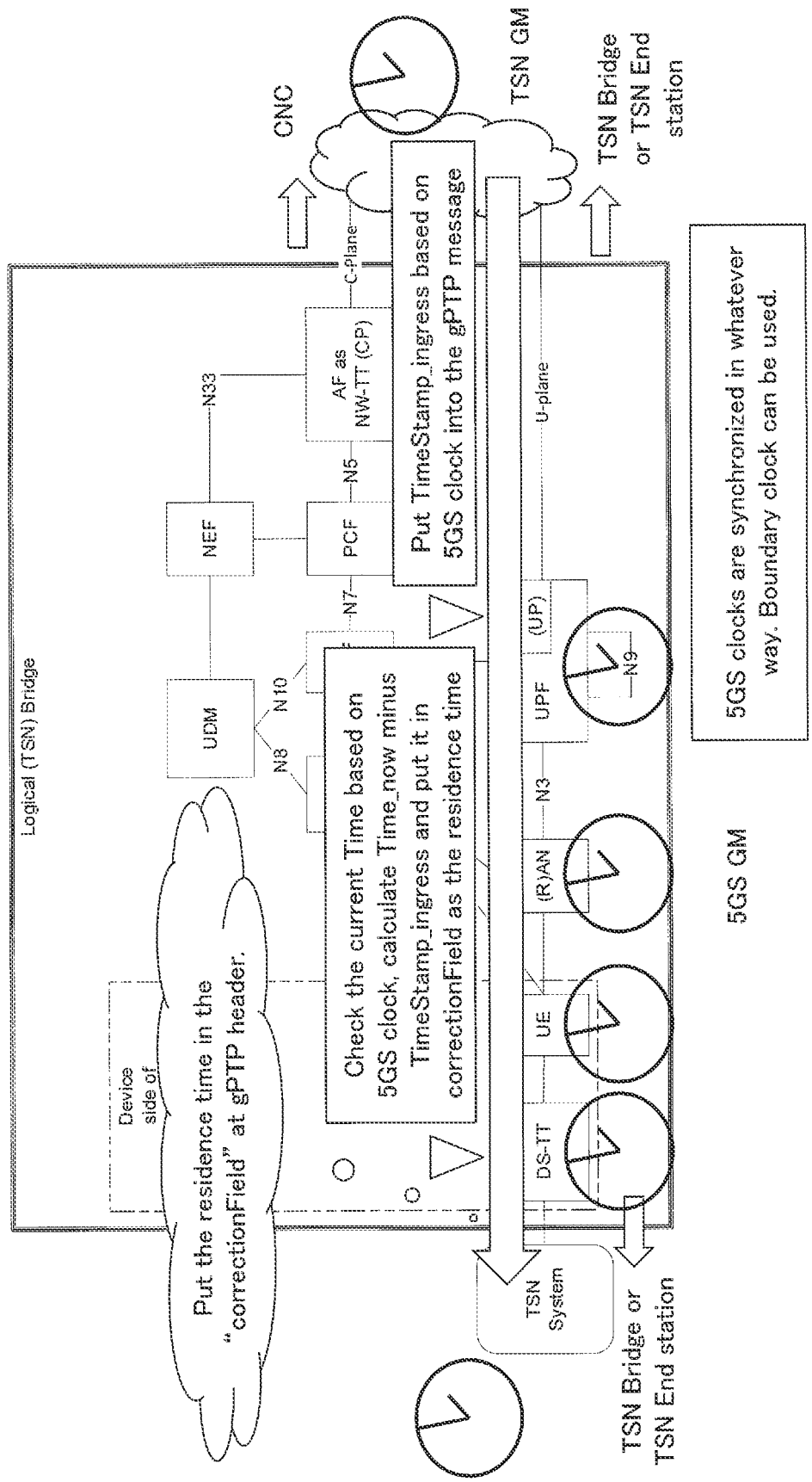
FIG. 4 is a diagram for explaining an operation in a TSN bridge.

Referring to FIG. 4, an example of a method for distributing a TSN clock will be described. Delivery of TSN clocks uses gPTP messages. A gPTP message includes a precession origin timestamp at the time when the gPTP message is sent, a correction field, and so on.

A gPTP message sent from a TSN end station or the like in a TSN time domain is received by the UPF 50 and an ingress time stamp (TSi) is added to the gPTP message by the NW-TT in the UPF 50. The NW-TT may be a function in the UPF 50 or may be a function outside the UPF 50.

The gPTP message is sent to the UE 10 using a PDU session for the UE 10 communication. The UE 10 transmits the received gPTP message to the DS-TT, and the DS-TT generates an egress time stamp (TSe) for the gPTP message, and calculates a residence time of the gPTP message in the 5G system as "TSe-TSi". The DS-TT stores the residence time in the correction field of the gPTP message and transmits it to the TSN end station and the like. The DS-TT may be a function in the UE 10 or may be a function outside the UE 10.

Regardless of the number of TSN time domains, a single PDU session is used per one UPF and per one UE for transmitting the gPTP message. FIG. 5 shows an example where gPTP messages for two TSN time domains are transmitted in one PDU session. Since the gPTP message contains a domain number to identify a TSN time domain, the end station receiving the gPTP message can identify a TSN time domain of the gPTP message by the domain number.

Delivery of the TSN clock and the timestamp described above is performed between the UE 10 and the UPF 50 for each TSN time domain. If the UE 10 is connected to multiple TSN time domains via a single UPF 50, the gPTP messages of all TSN time domains are transmitted to the UE 10 by the same single PDU session.

The above example focuses on a gPTP message. In practice, packets that are not limited to gPTP messages (e.g., a set of packets that are sent over a certain period of time) form a TSN stream and a TSN stream is sent from the TSN end station. A TSN time domain contains one or more TSN streams. Note that a TSN stream may be referred to as a TSC stream.

(About TSCAI)

For example, when establishing a QoS flow, a TSCAI (TSC Assistance Information) describing TSC traffic characteristics is provided to the RAN 30 from the SMF 40 via the AMF 20. The gNB that is the RAN 30 according to this embodiment can understand the TSN traffic pattern and perform efficient scheduling by TSCAI.

FIG. 6 (Table 5.27.2-1 of Non-Patent Document 1) shows an example of TSCAI. As shown in FIG. 6, TSCAI includes Flow Direction, Periodicity, and Burst Arrival Time. Flow Direction indicates whether a target TSC flow (in the present embodiment, "TSC flow" may be replaced with TSN stream) is uplink or downlink. Periodicity indicates a time interval (period) between two bursts in a series of traffic of the TSN stream. The Burst Arrival Time (burst arrival time) indicates the time of arrival of the first data burst of a series of traffic to the RAN 30 in uplink or downlink.

In this embodiment, the reference of the Burst Arrival Time and the Periodicity is 5G clock (5G time), and the SMF 40 maps the Burst Arrival Time and the Periodicity from the TSN clock that is the reference of the TSN stream to the 5G clock. This mapping may be performed by TSN AF 60.

For example, in a TSN time domain, assuming that the time of the 5G clock (e.g., a clock provided by the UPF 50) is advanced by ΔT with respect to the time of the TSN clock (e.g., a clock provided by the TSN end station). At this time, assuming that the Burst Arrival Time in the TSN clock is T, the SMF 40 calculates the Burst Arrival Time in the 5G clock as T+ΔT.

In the prior art described in non-patent document 1 and the like, if a drift (for example, change of ΔT) occurs between a TSN time (TSN time) in a TSN time domain and a 5G time (5G time), the UPF 50 notifies the SMF 40 of an offset and the SMF 40 notifies the RAN 30 of a TSCAI parameter modified based on the offset. The TSCAI parameter here is, for example, Burst Arrival Time, but is not limited to Burst Arrival Time. Also, "offset" is the difference (corrected ΔT) between TSN time and 5G time, but is not limited thereto. For example, the "offset" may be the amount of deviation from the ΔT before modification.

If the UE 10 is connected to multiple TSN time domains via a single UPF 50, the gPTP messages of all TSN time domains are transmitted to the UE 10 by the same single PDU session. Since there is no reason to treat each of these multiple TSN time domains as different QoS, in practice, it is assumed that all gPTP messages for all these TSN time domains will be transmitted in a single QoS flow. Here, gPTP messages belonging to a single TSN time domain are an example of a TSN stream. Even for a TSN stream formed of packets that are not limited to gPTP messages, a case in which multiple TSN streams of multiple TSN time domains are sent in a single QoS flow can be assumed.

The above modified TSCAI parameters need to be applied only to a specific TSN stream to which they are to be applied. However, since multiple TSN streams of multiple TSN time domains may belong to a single QoS flow, modified TSCAI parameters cannot be applied to only a specific TSN stream in the prior art. When TSCAI is applied to each TSN stream as in this embodiment, the above-described problem arises not only in the modified TSCAI parameter but also in the notification of a TSCAI parameter before modification.

In addition, in the prior art described in Non-Patent Document 1, etc., drift between a TSN time and a 5G time in a TSN time domain is considered, but since difference of rate of progress is not taken into consideration, there is a problem that Periodicity cannot be corrected.

In this embodiment, in order to solve the above-described problem, configuration of the TSCAI can be set for each QoS flow+TSN stream (identification information o TSN stream) on N2, and the identification information of the TSN stream can be set for the PDU Session user plan protocol on N3. In addition, changes of difference of rate of progress are taken into account. Hereinafter, this technique will be described in detail as an example.

Example

One QoS flow in this Example includes one or more TSN streams belonging to one or more TSN time domains. For example, one QoS flow may include TSN streams A-1 and A-2 belonging to TSN time domain A, and TSN streams B-1 and B-2 belonging to TSN time domain B.

As previously described, TSCAI is information per TSN stream. For example, TSCAI A-1 is provided for TSN stream A-1 and TSCAI A-2 is provided for TSN stream A-2.

The SMF 40 determines TSCAI parameters based on information obtained, for example, from the TSN AF 60. The SMF 40 may determine the TSCAI parameters based on information (such as offsets) reported from the UPF 50.

Figure 7:
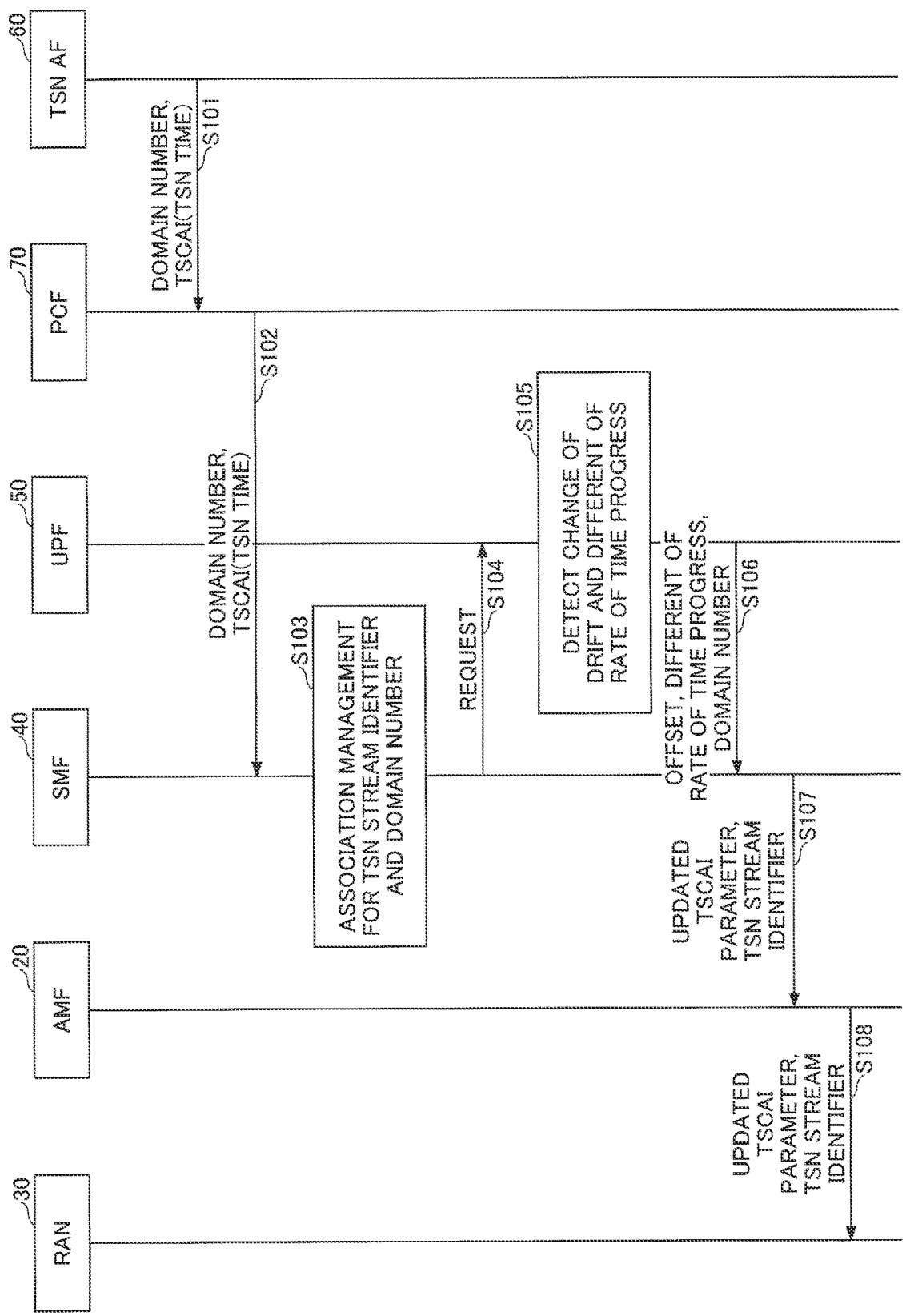
FIG. 7 is a diagram for explaining a processing sequence.

For example, for a TSN stream, TSN AF 60 transmits a TSN time domain number to which the TSN stream belongs and a TSCAI at TSN time to SMF 40 via PCF 70. The SMF 40 maintains and manages tying information (corresponding information) between the TSN stream identifier and the time domain number for each 1UE1UPF. An example of the processing flow of the present embodiment based on such a premise is shown in FIG. 7.

In S101, the TSN AF 60 transmits, for example, a domain number for the TSN stream being transmitted and a TSCAI at TSN time to the PCF 70. In S102, the PCF 70 transmits the domain number received from the TSN AF 60 and the TSCAI at TSN time to the SMF 40 as a PCC rule.

In S103, for each TSN stream containing the TSN stream, the SMF 40 retains (manages) information on the mapping (tying) of the TSN stream identifier and the time domain number. Management of this mapping (correspondence) is performed for each "1UE·1UPF". The SMF 40 also maps the TSCAI at TSN time to the TSCAI at 5G time and holds (manages) the TSCAI (5G time) associated with the corresponding TSN stream identifier.

In S104, the SMF 40 sends a message to the UPF 50 requesting that the UPF 50 report an offset (time difference between 5G time and TSN time) and a difference of rate of progress between 5G time and TSN time (hereinafter referred to as the "difference of rate of progress"). As will be described later, the difference of rate of progress is called "cumulative rateRatio." The offset and the difference of rate of progress can be referred to collectively as time comparison information.

The message may be, for example, a PFCP Session Establishment Request at the time of establishing a PDU session or a PFCP Session Modification Request at the time of modifying a PDU session. But, the message is not limited to these. The UPF 50 may, at its own discretion, report the offset and the difference of rate of progress to the SMF 40 without making a request of S104.

In the following description, offset report at the time of drift detection or report of difference of rate of progress at the time of detection of difference of rate of progress. However, this is an example. The UPF 50 may report offset, difference of rate of progress, or both of them for each TSN time domain detected in the corresponding PDU session, even when there is no drift detection, and no change detection of difference of rate of progress.

In S105, the UPF 50 detects drift between TSN time and 5G time in a TSN time domain in a corresponding PDU session for the UE 10. Alternatively, in S105, the UPF 50 detects a change in difference of rate of progress in a TSN time domain in the corresponding PDU session for the UE 10. Alternatively, in S105, the UPF 50 detects a drift and a change in difference of rate if progress in a TSN time domain in the corresponding PDU session for the UE 10.

Any method can be used for detecting a drift. For example, the UPF 50 may detect a drift by change of a difference between a time stamp provided by the NW-TT in the gPTP message of the TSN time domain and the TSN source time stamp, may detect a drift based on information from the TSN AF, or may detect a drift by other methods. Also, the method for detecting a change in difference of rate of progress may be any method, for example, the change in difference of rate of progress may be detected based on the time stamp described above.

In S106, the UPF 50 acquires the number (domain number) of the TSN time domain in which the drift or change in difference of rate of progress (or both) is detected from the gPTP message and transmits the message including the domain number and the offset and the difference of rate of progress to the SMF 40. This message is for example a PFCP Session Report Request. The domain number is extracted from the relevant gPTP message. When a drift is detected, the UPF 50 may transmit a domain number and an offset, and when a difference of rate of progress is detected, the UPF 50 may transmit the domain number and the difference if rate of progress.

The SMF 40 that receives the message determines (or updates) TSCAI parameters (e.g., Burst Arrival Time, and Periodicity) for all TSN streams (one or more TSN streams) for the UE 10, tied to the domain number received from the UPF 50, based on the offset and difference of rate of progress, and sends a message to the AMF 20 containing the TSCAI parameters and TSN stream identifiers per TSN stream (S107). This transmission is performed, for example, by step 3b (Namf_Communication_N1N2MessageTransfer) of PDU session modification (Non-Patent Document 2, FIG. 4.3.3.2-1).

In S108, the AMF 20 sends a message to the RAN 30 containing a TSN stream identifier and a TSCAI parameter (e.g., Burst Arrival Time, Periodicity) for each TSN stream to which the TSCAI parameter is applied. This transmission is performed, for example, by step 4 (N2 PDU Session Request) of the PDU session modification (Non-Patent Document 2, FIG. 4.3.3.2-1).

It is assumed that, based on the TSCAI received before the execution of S108 shown in FIG. 7, a control unit of the RAN 30 prepares (allocates) a time slot so that the RAN 30 transmits data of Burst Arrival Time=T, period P, and size S per period in a TSN stream to the UE 10 or the UPF 50 by a QoS flow in a PDU session. At this time, if the RAN 30 receives Burst Arrival Time=T+ΔD and Periodicity P+ΔP with respect to the TSN stream in S108 of FIG. 7, the control unit of the RAN 30 allocates a time slot by shifting the start of the time slot to T+ΔD and using the Periodicity P+ΔP for the TSN stream.

"Allocate" means to reserve the time slot for transmission of the Burst data. When the Burst data arrives from the UPF 50 or the UE 10, the transmission unit of the RAN 30 transmits the Burst data to the UE 10 or the UPF 50 in the reserved time slot.

(Example of Change in Specification)

The following is an example of changes to the specifications (specifications) corresponding to the above-mentioned flow. The communication system of the present embodiment operates in accordance with the modified specification, for example.

FIG. 8 shows a change from Non-Patent Document 1 (extract of TS38.501). In particular, as described ia "In the case of change of the cumulative rateRatio between TSN time and 5G time, the UPF updates the cumulative rateRatio to SMF.", it is specified that the UPF 50 updates the cumulative rateRatio for SMF 40 if the cumulative rateRatio (difference in rate of progress) changes. Also, as described as "The TSCAI is signalled to the 5G-AN per TSN stream. This applies also to the case when multiple TSN streams are forwarded via the same QoS flow in the same PDU session", it is specified that TSCAI is reported to 5G-AN for each stream.

In addition, as described as "To address each individual drift and change of the cumulative rateRatio between each TSN time and 5G time when supporting multiple TSN working domains, the UPF updates the offset and the cumulative rateRatio to SMF per TSN working domain. Then the SMF identifies TSN streams belonging to each TSN working domain within the same UE and the same UPF, calculates revised TSCAIs, and triggers PDU session modification(s)", it is specified that the UPF 50 updates offset and cumulative rateRatio for each TSN time domain for the SMF 40, the SMF 40 identifies TSN stream belonging to the TSN time domain for each TSN time domain in the same UE and same UPF, calculates the updated TSCAI, and activates PDU session modification(s).

FIGS. 9 to 11 are examples of specification changes corresponding to S101 and S102 of FIG. 7, and show changes from Non-Patent Document 7 (extract of TS23.503). FIG. 9 is an excerpt of 5.3.1 Interactions between PCF and AF. As described as "TSN AF provides burst arrival time (in reference to TSN GM), periodicity (in reference to TSN GM), flow direction, and time domain identifier needed for TSCAI determination (as described in clauses 5.27 and 5.28 of TS 23.501 [2]).", the TSN AF 60 provides burst arrival time (in reference to TSN GM), periodicity (in reference to TSN GM), flow direction, and time domain identifier, required for TSCAI detection.

FIG. 10(a) shows TSN AF Parameters input from TSN AF 60 to PCF 70, and FIG. 10(b) shows TSN AF QoS Containers provided from PCF 70 to SMF 40. FIG. 11 is a description of the TSN AF container.

FIGS. 12-27 are examples of specification changes of parts corresponding to S104 and S105 of FIG. 7 and show changes from Non-Patent Document 3 (extract of TS29.244).

FIG. 12 defines Reporting of the offset and the cumulative rateRatio between TSN time and 5G time to the SMF. In a PFCP Session Establishment Request or PFCP Session Modification Request, the SMF 40 can request the UPF 50 to start or stop reporting the offset between TSN time and 5G time and cumulative rateRatio. The UPF 50 that receives a request for reporting reports, for example, the offset values in which a drift is detected and cumulative rateRatio in which change is detected, of all domain numbers, together with the corresponding domain numbers, to the SMF 40 by a PFCP Session Report Procedure. The details are as shown in FIG. 12.

FIG. 13 shows details of the information elements of the PFCP Session Establishment Request, with Create PTR added. FIG. 14 shows details of the Create PDR IE in which PTR ID is added. FIG. 15 shows Ethernet Packet Filter IE within PFCP Session Establishment Request, in which EtherType is added. This EtherType IE is a key for the UPF 50 to perform DPI for detecting a value or a field of a gPTP message. FIG. 16 shows details of Create PTR IE within PFCP Session Establishment Request.

FIG. 17 shows information elements of the PFCP Session Modification Request, in which Remove PTR, Create PTR, and Update PTR are added. FIG. 18 shows details of Update PDR IE within PFCP Session Modification Request in which PTR ID is added. FIG. 19 shows details of the Update PTR IE and FIG. 20 shows details of the Remove PTR IE.

FIG. 21 shows information elements of the PFCP Session Report Request in which PTP Report is added. FIG. 22 shows details of the PTP Report IE, which defines reporting a set of domain number and offset and cumulative rateRatio as time comparison information. FIGS. 23-27 show details of Report Type, EtherType, PTR ID, PTP Reporting Triggers, Domain Number, Time Offset, Time RateRatio.

FIGS. 28-30 show changes from Non-Patent Document 2 (abstract of TS23.502). FIG. 28 shows modification of Non-Patent Document 2, 4.3.2.2.1, showing modification of step 10a of UE-requested PDU Session Establishment as shown in FIG. 4.3.2.2.1-1. As shown in FIG. 28, when SMF 40 determines to use TSCAI in a PDU session, the SMF 40 includes rules for detection of drift of offset and change of cumulative rateRatio into N4 Session Establishment/Modification Request.

FIG. 29 is a change of step 1d of UE or network requested PDU Session Modification shown in FIG. 4.3.3.2-1 of Non-Patent Document 2. As described in FIG. 29, for example, when the UPF 50 reports a drift or cumulative rateRatio change, SMF requested modification is triggered to update the TSCAI.

FIG. 30 is a modification of step 2a of UE or network requested PDU Session Modification shown in Non-Patent Document 2, FIG. 4.3.3.2-1. When the SMF 40 determines that TSCAI is used in the PDU session, the SMF 40 includes, in the N4 Session Establishment/Modification Request, rules for drift and cumulative rateRatio change detection.

For notifying a domain number and a TSCAI parameter from the SMF 40 to the AMF 20, for example, the N1N2MessageTransfer shown in step 11 of FIG. 4.3.2.2.1-1 (UE-requested PDU Session Establishment) of Non-Patent Document 2 (TS23.502) and step 3b of FIG. 4.3.3.2-1 (UE or network requested PDU Session Modification) is used. Specifically, the N1N2MessageTransferRefData, which includes the TSN stream identifier and the TSCAI parameter, is sent from the SMF 40 to the AMF 20. As will be described later, the TSN stream identifier and the TSCAI parameter are transmitted as a list having "a set of TSN stream identifier and TSCAI parameter" for each of one or more TSN stream identifiers. However, the sending in the form of a list is an example and it may be transmitted in a way other than the list.

N1N2MessageTransferReferqData includes N2InfoContainer as shown in 6.1.6.2.18 of Non-Patent Document 4 (TS29.518). As shown in 6.1.6.2.15, N2InfoContainer includes N2SmInformation. As shown in 6.1.6.2.26, N2SmInformation includes N2InfoContent. As shown in 6.1.6.2.27, N2InfoContent includes ngapData.

In addition, as shown in 6.1.6.4.3.2, there is a description to refer to Non-Patent Document 5 (TS38.413) regarding PDU Session Resource Setup Request Transfer IE, PDU Session Resource Request Transfer IE, etc., which is the content of NGAP IE. The operation of this embodiment follows Non-Patent Document 4 (TS29.518) and the specification modified from Non-Patent Document 5 (TS38.413).

FIGS. 31 to 35 show a modification example 1 from Non-Patent Document 5 (abstract of TS38.413). FIG. 31 shows a changed part of 8.2.1.2 Successful Operation of the PDU session resource setup performed between the AMF 20 and the RAN 30. In the PDU Session Resource Setup Request sent from the AMF 20 to the RAN 30, the RAN 30 must consider the Traffic Characteristics list IE if the Traffic Characteristics list IE is included in the PDU Session Resource Setup Request Transfer IE of the PDU SESSION RESOURCE SETUP REQUEST message for each QoS flow requesting setup.

FIG. 32 shows a changed part of 8.2.3.2 Successful Operation of the PDU session resource modify performed between the AMF 20 and the RAN 30. In the PDU Session Resource Modification Request sent from the AMF 20 to the RAN 30, if the Traffic Characteristics list IE is included in the PDU Session Resource Request Transfer IE of the PDU SESSION RESOURCE MODIFY REQUEST message, the RAN 30 must consider the Traffic Characteristics list IE.

FIG. 33 is a detailed description of the PDU Session Resource Setup Request Transfer IE, which describes Traffic Characteristics. FIG. 34 shows that the Traffic Characteristic item of the Traffic Characteristics list consists of a Tsn Stream identifier and a Traffic Characteristic. FIG. 35 shows details of Tsn Stream identifier and Traffic Characteristic.

FIGS. 36-37 show a modification 2 from Non-Patent Document 5 (excerpt of TS38.413). FIG. 36 shows that the TSC Assistance Information List including the TSC Assistance information per TSN stream is included in the GBR QoS Flow Information sent from AMF 20 to RAN 30. FIG. 37 is a detailed description of the TSC Assistance Information and Tsn Stream identifier.

Figure 39:
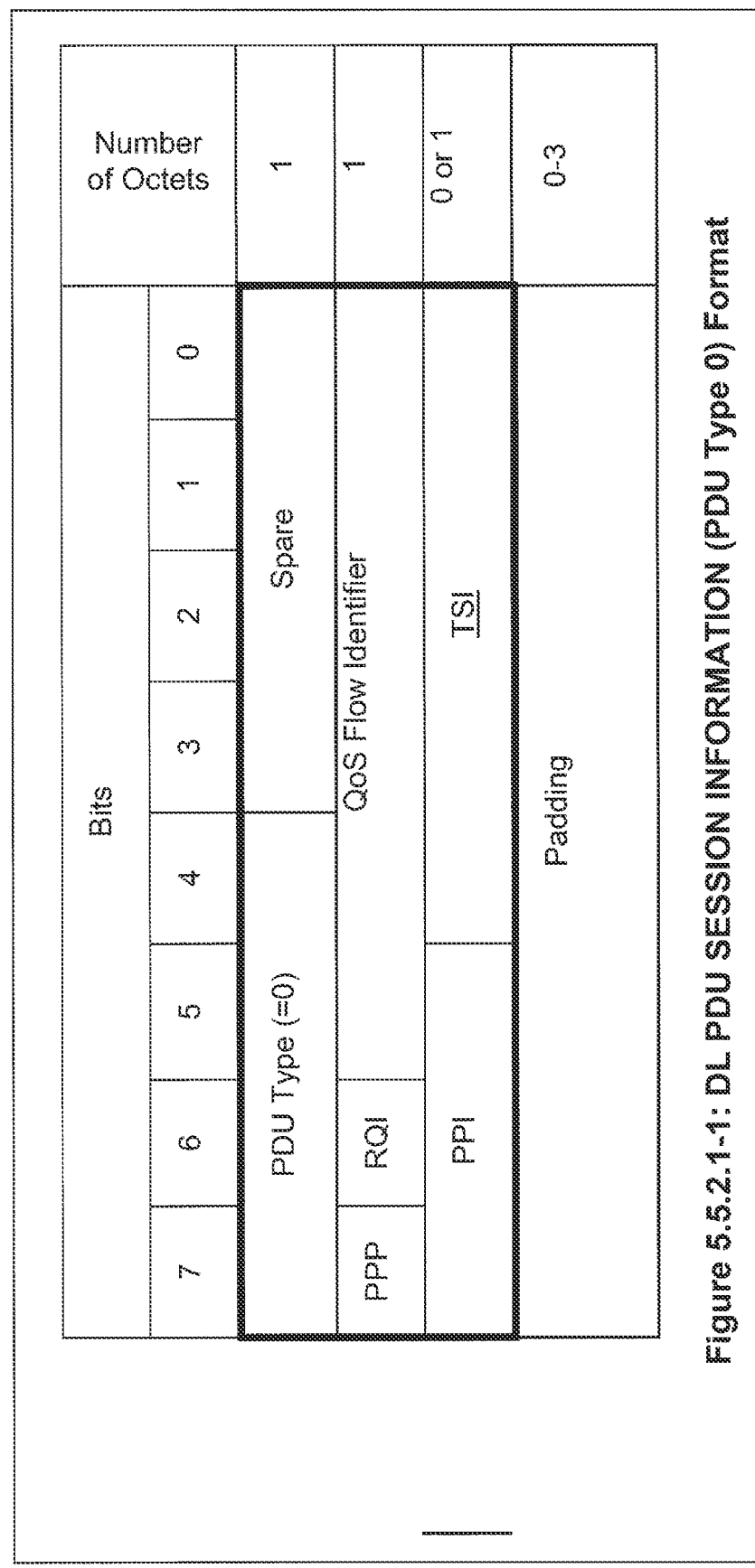
FIG. 39 is a diagram showing an example of changes to the specification (TS38.415).

FIGS. 38-40 show examples of modifications from Non-Patent Document 6 (excerpts from TS38.415). As described in FIG. 38, in this embodiment, the DL PDU SESSION INFORMATION frame may include a Tsn Stream identifier (TSI) field. The RAN 30 can identify the TSN stream to which the received packet belongs by the TSI. FIG. 39 shows DL PDU SESSION INFORMATION (PDU Type 0) Format. FIG. 40 shows the details of the Tsn Stream identifier (TSI).

The modifications shown in FIGS. 38 to 40 are not mandatory. Without the modifications shown in FIGS. 38-40, the RAN 30 can understand the Burst Arrival Time, Periodicity, etc. per TSN stream based on TSCAI per TSN stream, thereby processing can be performed for packets per TSN stream.

As described above, according to the present Example, the assistance information for time sensitive communication can be applied only to a specific TSN stream.

(Equipment Configuration)

Next, a functional configuration example of the base station apparatus 30 corresponding to the RAN 30, the access mobile management apparatus 20 corresponding to the AMF 20, the session management apparatus 40 corresponding to the SMF 40, and the user plane apparatus 50 corresponding to the UPF 50 will be described. The configurations of the TSN AF 60 and the PCF 70 are the same as those shown in FIGS. 41 to 45.

<Base Station Apparatus 30>

Figure 41:
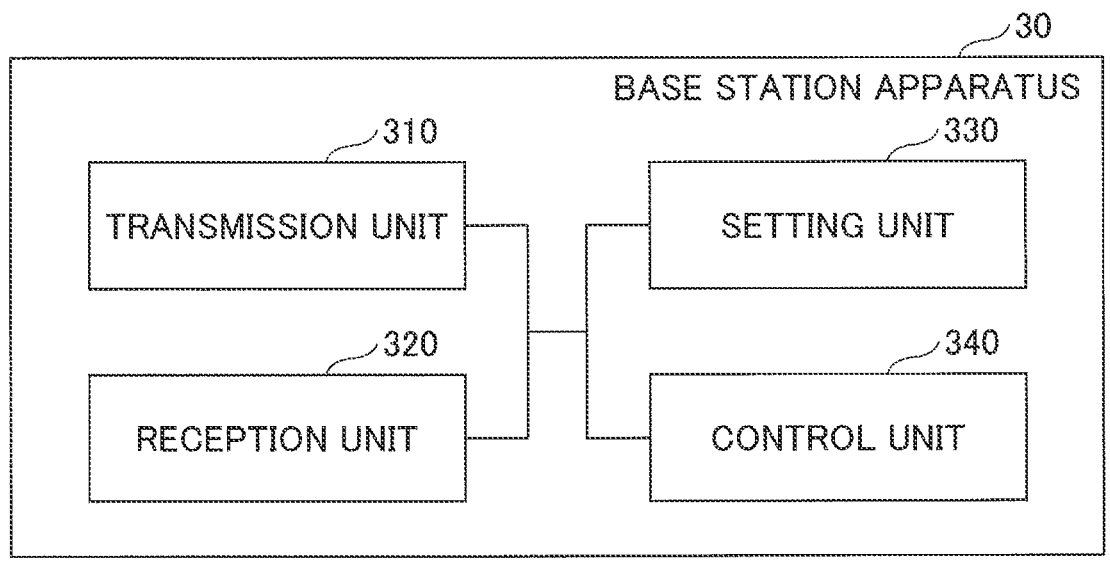
FIG. 41 is a diagram showing an example of a functional configuration of the base station apparatus 30 according to an embodiment of the present invention.

FIG. 41 is a diagram illustrating an example of a functional configuration of the base station apparatus 30. As shown in FIG. 41, the base station apparatus 30 includes a transmission unit 310, a reception unit 320, a setting unit 330, and a control unit 340. The functional configuration shown in FIG. 37 is only one example. If the operation according to the embodiments of the present invention can be performed, the functional category and the name of the functional unit may be any one.

The transmission unit 310 includes a function for generating a signal to be transmitted and transmitting the signal to a terminal side (Uu side) and a core network side. The reception unit 320 includes a function for receiving various signals from the terminal side (Uu side) and the core network side and acquiring, for example, information of a higher layer from the received signals. The transmission unit 310 and the reception unit 320 may be referred to as a transmitter and a receiver, respectively.

The setting unit 330 stores configuration information in the storage device (storage unit) and reads the configuration information from the storage device as necessary. The control unit 340 controls the base station apparatus 30.

For example, the reception unit 320 receives a message including TSC assistance information and identification information of the TSN stream to which the TSC assistance information is to be applied from the network apparatus, and the transmission unit 310 transmits data based on the TSC assistance information.

<Access Mobility Management Apparatus 20>

Figure 42:
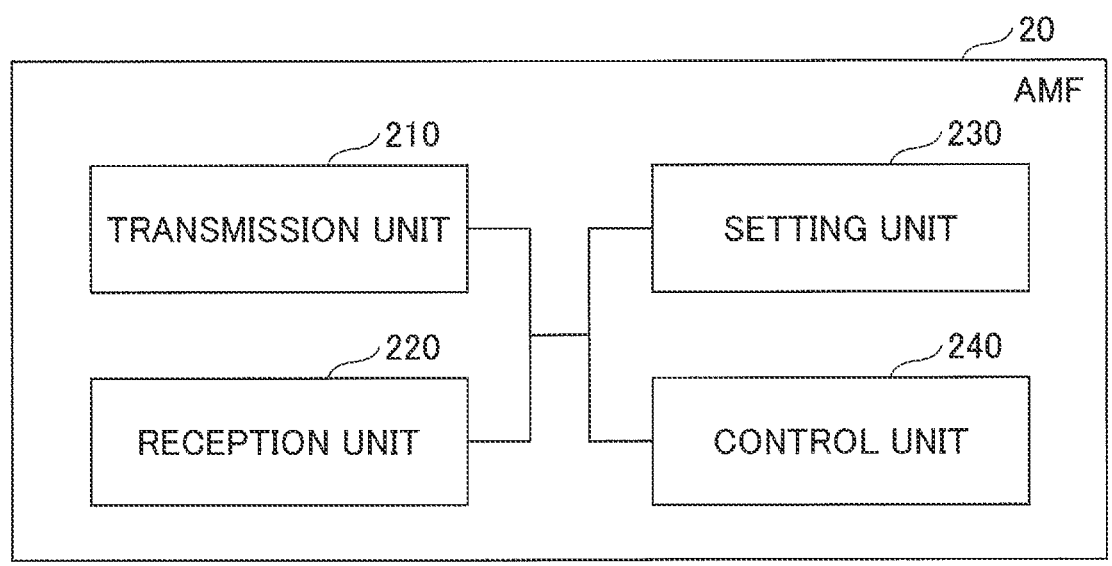
FIG. 42 is a diagram showing an example of a functional configuration of the AMF 20 according to an embodiment of the present invention.

FIG. 42 is a diagram illustrating an example of a functional configuration of an access mobile management apparatus 20. As shown in FIG. 42, the access mobile management apparatus 20 includes a transmission unit 210, a reception unit 220, a setting unit 230, and a control unit 240. The functional configuration shown in FIG. 42 is only one example. If the operation according to the embodiments of the present invention can be performed, the functional category and the name of the functional unit may be any one.

The transmission unit 210 includes a function for generating a signal to be transmitted and transmitting the signal to a network. The reception unit 220 includes a function for receiving various signals and acquiring, for example, information of a higher layer from the received signals. The transmission unit 210 and the reception unit 220 may be called a transmitter and a receiver, respectively.

The setting unit 230 stores configuration information in the storage device (storage unit) and reads the configuration information from the storage device as necessary. The control unit 240 controls the access mobile management apparatus 20.

<Session Management Apparatus 40>

Figure 43:
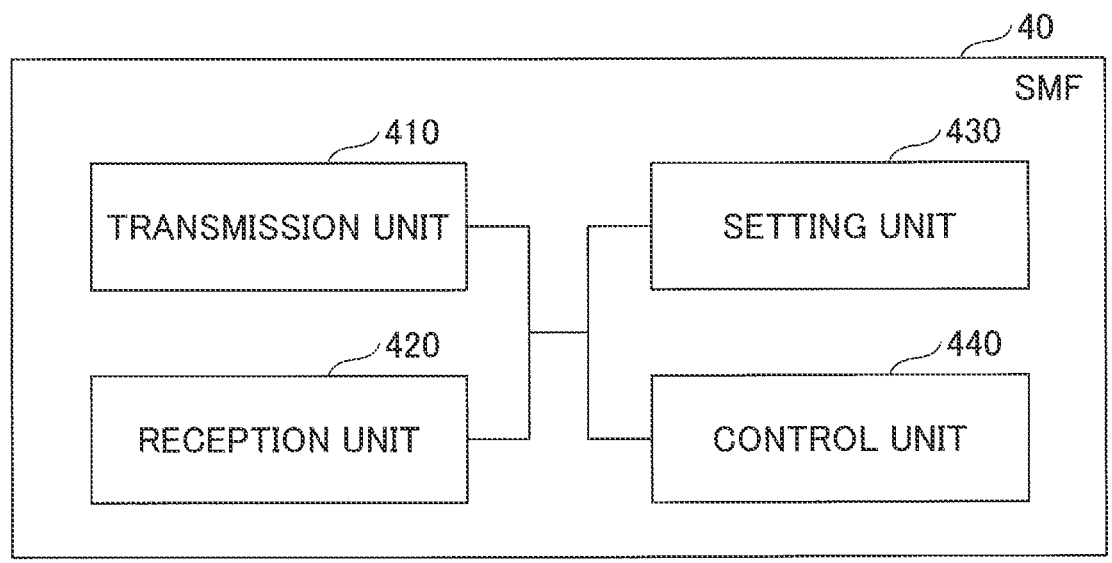
FIG. 43 is a diagram showing an example of a functional configuration of the SMF 40 according to an embodiment of the present invention.

FIG. 43 is a diagram illustrating an example of a functional configuration of the session management apparatus 40. As shown in FIG. 43, the session management apparatus 40 includes a transmission unit 410, a reception unit 420, a setting unit 430, and a control unit 440. The functional configuration shown in FIG. 43 is only one example. If the operation according to the embodiments of the present invention can be performed, the functional category and the name of the functional unit may be any one.

The transmission unit 410 includes a function for generating a signal to be transmitted and transmitting the signal to a network. The reception unit 420 includes a function for receiving various signals and acquiring, for example, information of a higher layer from the received signals. The transmitting unit 410 and the receiving unit 420 may be referred to as a transmitter and a receiver, respectively.

The setting unit 430 stores configuration information in the storage device (storage unit) and reads the configuration information from the storage device as necessary. The control unit 440 controls the session management apparatus 40.

<User Plane Apparatus 50>

Figure 44:
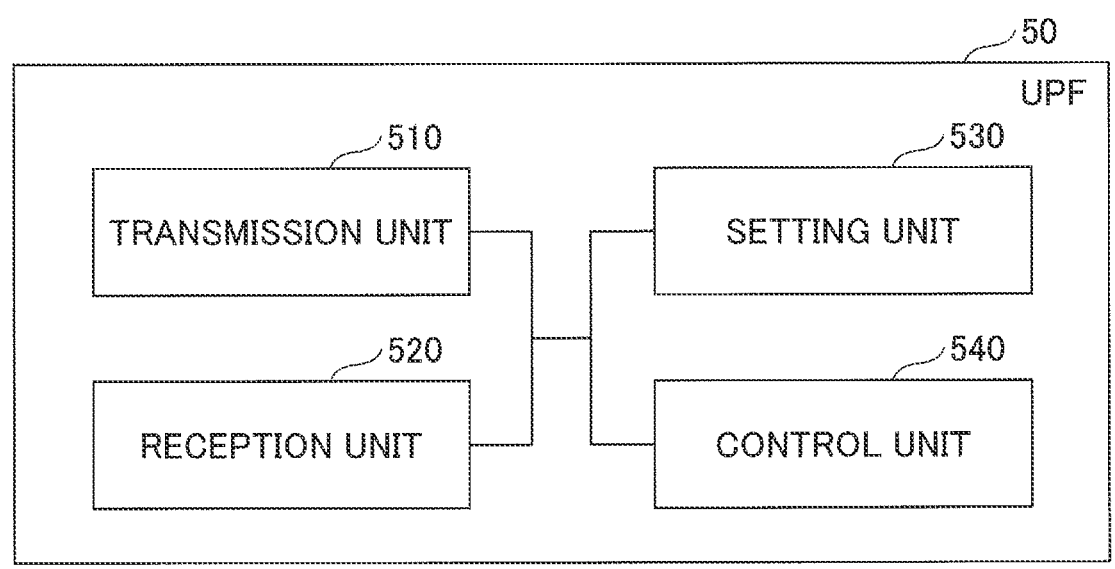
FIG. 44 is a diagram showing an example of a functional configuration of the UPF 50 according to an embodiment of the present invention.

FIG. 44 is a diagram illustrating an example of the functional configuration of the user plane apparatus 50. As shown in FIG. 44, the user plane apparatus 50 includes a transmission unit 510, a reception unit 520, a setting unit 530, and a control unit 540. The functional configuration shown in FIG. 44 is only one example. If the operation according to the embodiments of the present invention can be performed, the functional category and the name of the functional unit may be any one.

The transmission unit 510 includes a function for generating a signal to be transmitted and transmitting the signal to a network. The reception unit 520 includes a function for receiving various signals and acquiring, for example, information of a higher layer from the received signals. The transmission unit 510 and the reception unit 520 may be referred to as a transmitter and a receiver, respectively.

The setting unit 530 stores configuration information in the storage device (storage unit) and reads the configuration information from the storage device as necessary. The control unit 540 controls the user plane apparatus 50.

(Hardware Configuration)

Block diagrams (FIGS. 41-44) used for the description of the above embodiments show blocks of functional units. These functional blocks (components) are implemented by any combination of hardware and/or software. In addition, the implementation method of each function block is not particularly limited. That is, each functional block may be implemented using a single device that is physically or logically combined, or two or more devices that are physically or logically separated may be directly or indirectly connected (e.g., using wired, wireless, etc.) and implemented using these multiple devices. The functional block may be implemented by combining software with the device or devices.

Functions include, but are not limited to, judgment, determination, determination, calculation, calculation, processing, derivation, research, search, verification, reception, transmission, output, access, resolution, selection, selection, establishment, comparison, assumption, expectation, and deeming; broadcasting, notifying, communicating, forwarding, configuring, reconfiguring, allocating, mapping, and assigning. For example, a functional block (component) that functions to transmit is called a transmitting unit or a transmitter. In either case, as described above, the realization method is not particularly limited.

Figure 45:
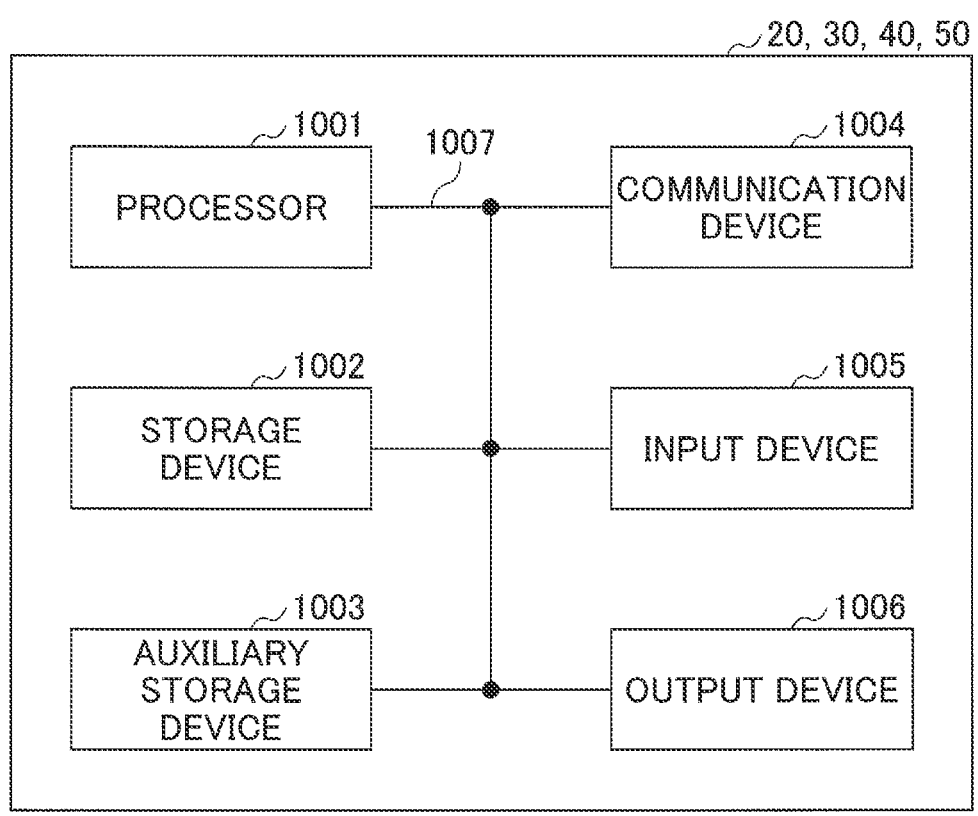
FIG. 45 is a diagram illustrating an example of the hardware configuration of the base station apparatus 30, the AMF 20, the SMF 40, and the UPF 50 according to an embodiment of the present invention.

For example, the base station apparatus 30, the access mobile management apparatus 20, the session management apparatus 40, the user plane apparatus 50, TSN AF 60, PCF 70 and the like according to an embodiment of the present disclosure may function as a computer for processing the present disclosure. FIG. 45 is a diagram illustrating an example of a hardware configuration such as a base station apparatus 30, an access mobile management apparatus 20, a session management apparatus 40, a user plane apparatus 50, TSN AF 60, and PCF 70 according to an embodiment of the present disclosure. The base station apparatus 30, the access mobile management apparatus 20, the session management apparatus 40, and the user plane apparatus 50 described above may be physically configured as a computer device including a processor 1001, a storage device 1002, an auxiliary storage device 1003, a communication device 1004, an input device 1005, an output device 1006, a bus 1007, and the like. The base station apparatus 30, the access mobile management apparatus 20, the session management apparatus 40, the user plane apparatus 50, or the like may be virtual machines.

In the following description, the term "apparatus" can be read as circuits, devices, units, etc. The hardware configuration of the base station apparatus 30, the access mobile management apparatus 20, the session management apparatus 40, and the user plane apparatus 50 and the like may be configured to include one or more of the devices shown in the figure or may be configured without some of the devices.

The functions of the base station apparatus 30, the access mobile management apparatus 20, the session management apparatus 40, and the user plane apparatus 50 are realized by performing an operation by the processor 1001 by reading predetermined software (programs) on hardware such as the processor 1001, the storage device 1002, or the like, and controlling communication by the communication device 1004 or reading and/or writing data in the storage device 1002 and the auxiliary storage device 1003.

Processor 1001 operates, for example, an operating system to control the entire computer. The processor 1001 may be comprised of a central processing unit (CPU) including an interface with peripheral devices, a controller, an arithmetic unit, a register, and the like. For example, the above-described control portion 340, control portion 440, control portion 540, and the like may be implemented by the processor 1001.

The processor 1001 reads out a program (program code), software module, data, or the like from at least one of the auxiliary storage device 1003 and the communication device 1004 to the storage device 1002 and performs various processing in accordance with the above. As a program, a program that causes a computer to execute at least a part of the operation described in the above-described embodiment is used. For example, the control portion of each device may be stored in the storage device 1002 and implemented by a control program operating in the processor 1001. Although the foregoing processes have been described and executed by one processor 1001, they may be executed simultaneously or sequentially by two or more processors 1001. Processor 1001 may be implemented by one or more chips. The program may be transmitted from the network via a telecommunication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 30, the access mobility management apparatus 20, the session management apparatus 40 and the user plane apparatus 50 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

Summary of Embodiments

According to the present embodiment, at least the session management apparatus, the user plane apparatus, and the access mobility management apparatus shown in the following items 1 to 6 are provided.

(Item 1)

A session management apparatus including:
  a reception unit configured to receive, from a user plane apparatus, time comparison information between a TSN time of a TSN time domain and a 5G time, and identification information of the TSN time domain; and
  a transmission unit configured to transmit, to a base station apparatus, TSN assistance information determined based on the time comparison information and identification information of a TSN stream for each of one or more TSN streams that belong to the TSN time domain.

(Item 2)

The session management apparatus as described in item 1, wherein the time comparison information is a time offset between a TSN time of the TSN time domain and a 5G time, a difference of rate of time progress between the TSN time of the TSN time domain and the 5G time, or both of the time offset and the difference of rate of time progress.

(Item 3)

The session management apparatus as described in item 1 or 2, wherein, when the user plane apparatus detects a drift or a change difference of rate of time progress between the TSN time of the TSN time domain and the 5G time, the reception unit receives the time comparison information and identification information of the TSN time domain.

(Item 4)

A user plane apparatus including:
  a control unit configured to detect a drift or a change of a difference of rate of time progress between a TSN time of a TSN time domain and a 5G time; and
  a transmission unit configured, when the drift or the change of the difference of rate of time progress is detected, to transmit, to the session management apparatus, time comparison information of the TSN time of the TSN time domain and the 5G time, and identification information of the TSN time domain.

(Item 5)

An access mobile management apparatus including: a reception unit configured to receive, from a session management apparatus, a TSC assistance information, and identification information of a TSN stream to be applied to the TSC assistance information; and
  a transmission unit configured to transmit, to a base station apparatus, the TSC assistance information, and the identification information of the TSN stream to be applied to the TSC assistance information.

(Item 6)

The access mobile management apparatus as described in item 5, wherein the transmission unit transmits, to the base station apparatus, a message including a list that includes, for each of one or more TSN streams, TSC assistance information and identification information of a TSN stream to which the TSC assistance information should be applied.

According to any one of the items 1 to 6, there is provided a technique that allows TSC assistance information to be applied only to a specific TSN stream.

Supplements to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 30, the access mobility management apparatus 20, the session management apparatus 40 and the user plane apparatus 50 have been described with the use of the functional block diagrams, but these apparatuses may be implemented by hardware, software, or a combination thereof. Each of software functioning with a processor of each apparatus according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 30, the access mobility management apparatus 20, the session management apparatus 40 and the user plane apparatus 50 and the like described in the present disclosure may in some cases be performed by another node.

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUSCH, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements.

Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot.

A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user terminal 20 to assign, in TTI units, radio resources (such as frequency bandwidths, transmission power, and the like that can be used by each user terminal 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

DESCRIPTION OF SYMBOLS

20 Access mobile management apparatus
210 Transmission unit
220 Reception unit
230 Setting unit
240 Control unit
30 Session management apparatus
310 Transmission unit 320 Reception unit
330 Setting part
340 Control unit
40 Session management apparatus
410 Transmission unit
420 Reception unit
430 Setting unit
440 Control unit
50 User plane apparatus
510 Transmission unit
520 Reception unit
530 Setting unit
540 Control unit
1001 Processor
1002 Storage memory
1003 Auxiliary storage device
1004 Communication device
1005 Input device
1006 Output device

The invention claimed is:

1. A session management apparatus comprising:
a transmitter configured to transmit a request for a report to a user plane apparatus; and
a receiver configured to receive, from the user plane apparatus, a difference of rate of time progress between a clock of an external time domain and a 5G system clock, and identification information of the external time domain,
wherein the transmitter transmits, to a base station apparatus, communication assistance information determined based on the difference of rate of time progress, and
wherein the difference of rate of time progress is a cumulative rate ratio between the clock of the external time domain and the 5G system clock.

2. The session management apparatus as claimed in claim 1, wherein, when the user plane apparatus detects a trigger on a drift between the clock of the external time domain and the 5G system clock, the receiver receives the difference of rate of time progress and the identification information of the external time domain.

3. A user plane apparatus comprising:
a receiver configured to receive a request for a report from a session management apparatus;
a processor configured to detect a trigger on a drift between a clock of an external time domain and a 5G system clock; and
a transmitter configured to transmit, to the session management apparatus, a difference of rate of time progress between the clock of the external time domain and the 5G system clock, and identification information of the external time domain,
wherein the difference of rate of time progress is a cumulative rate ratio between the clock of the external time domain and the 5G system clock.

4. A communication system comprising:
a session management apparatus comprising:
a transmitter configured to transmit a request for a report to a user plane apparatus; and
a receiver configured to receive, from the user plane apparatus, a difference of rate of time progress between a clock of an external time domain and a 5G system clock, and identification information of the external time domain,
wherein the transmitter transmits, to a base station apparatus, communication assistance information determined based on the difference of rate of time progress, and
a user plane apparatus comprising:
a receiver configured to receive a request for a report from the session management apparatus;
a processor configured to detect a trigger on a drift between a clock of an external time domain and a 5G system clock; and
a transmitter configured to transmit, to the session management apparatus, a difference of rate of time progress between the clock of the external time domain and the 5G system clock, and identification information of the external time domain,
wherein the difference of rate of time progress is a cumulative rate ratio between the clock of the external time domain and the 5G system clock.

5. A communication method executed by a session management apparatus, comprising:
transmitting a request for a report to a user plane apparatus;
receiving, from the user plane apparatus, a difference of rate of time progress between a clock of an external time domain and a 5G system clock, and identification information of the external time domain; and
transmitting, to a base station apparatus, communication assistance information determined based on the difference of rate of time progress,
wherein the difference of rate of time progress is a cumulative rate ratio between the clock of the external time domain and the 5G system clock.

* * * * *